United States Patent
Ahmad et al.

(10) Patent No.: US 11,790,492 B1
(45) Date of Patent: Oct. 17, 2023

(54) METHOD OF AND SYSTEM FOR CUSTOMIZED IMAGE DENOISING WITH MODEL INTERPRETATIONS

(71) Applicant: THALES SA, Courbevoie (FR)

(72) Inventors: Ola Ahmad, Montreal (CA); Freddy Lecue, Montreal (CA)

(73) Assignee: THALES SA, Courbevoie (FR)

( * ) Notice: Subject to any disclaimer, the term of this patent is extended or adjusted under 35 U.S.C. 154(b) by 349 days.

(21) Appl. No.: 17/125,184

(22) Filed: Dec. 17, 2020

Related U.S. Application Data

(60) Provisional application No. 62/949,740, filed on Dec. 18, 2019.

(51) Int. Cl.
  *G06K 9/00* (2022.01)
  *G06T 5/00* (2006.01)
  (Continued)

(52) U.S. Cl.
  CPC .............. *G06T 5/002* (2013.01); *G06N 3/045* (2023.01); *G06N 3/08* (2013.01); *G06T 5/50* (2013.01);
  (Continued)

(58) Field of Classification Search
  CPC . G06T 2207/10028; G06T 2207/10044; G06T 2207/10081; G06T 2207/10116; G06T 2207/10088; G06T 2207/10104; G06T 2207/10136; G06T 2207/10056; G06T 2207/10048; G06T 2207/10061; G06T 7/0012; G06T 7/0002; G06T 7/80;
  (Continued)

(56) References Cited

U.S. PATENT DOCUMENTS 6,819,790 B2 * 11/2004 Suzuki ............... G06K 9/62
10,839,488 B2 * 11/2020 Bergner ............ G06T 5/002
(Continued)

FOREIGN PATENT DOCUMENTS

WO  2021110262  *  6/2021  ............ G06T 5/00

OTHER PUBLICATIONS

Prendes et al. "Performance Assessment of a Recent Change Detection Method for Homogeneous and Heterogeneous Images" Jan. 2015.*

*Primary Examiner* — Andrew M Moyer
*Assistant Examiner* — Owais Iqbal Memon
(74) *Attorney, Agent, or Firm* — HAUPTMAN HAM, LLP

(57) ABSTRACT

There is provided a method and a system for customized image denoising with interpretability. A deep neural network (NN) is trained to denoise an image on a training dataset including pairs of noisy and corresponding clean images acquired from an imaging apparatus, where during the training a structured covariance score (SCS) indicative of a performance of the deep NN in recovering content of corresponding clean images relative to the denoised image is determined based on sparse conditional correlations. A test noisy image is received and denoised by the deep NN. A user feedback score indicative of user satisfaction of the denoising is obtained. A quality parameter is obtained based on the SCS and a quality metric indicative of denoised image quality is obtained from a pretrained NN, and compared with the user feedback score. If the SCS is above the user feedback score, the deep NN is provided for denoising.

20 Claims, 6 Drawing Sheets

(51) Int. Cl.
    *G06T 5/50*         (2006.01)
    *G06T 7/00*         (2017.01)
    *G06T 7/80*         (2017.01)
    *G06N 3/08*         (2023.01)
    *G06N 3/045*        (2023.01)

(52) U.S. Cl.
    CPC .............. *G06T 7/0002* (2013.01); *G06T 7/80* (2017.01); *G06T 2207/10028* (2013.01); *G06T 2207/10044* (2013.01); *G06T 2207/10081* (2013.01); *G06T 2207/10116* (2013.01); *G06T 2207/20081* (2013.01); *G06T 2207/20084* (2013.01); *G06T 2207/20092* (2013.01); *G06T 2207/30168* (2013.01)

(58) Field of Classification Search
    CPC ...... G06T 2207/20081; G06T 2200/24; G06N 3/0454; G06N 3/0481
    See application file for complete search history.

(56) References Cited

U.S. PATENT DOCUMENTS

| | | | |
|---|---|---|---|
| 10,949,951 B2 * | 3/2021 | Tang | G06T 5/00 |
| 11,398,012 B2 * | 7/2022 | Wang | G06T 5/001 |
| 2018/0225823 A1 * | 1/2018 | Zhou | G06T 7/00 |
| 2019/0104940 A1 * | 4/2019 | Zhou | G06F 19/00 |
| 2020/0202502 A1 * | 6/2020 | Tsymbalenko | G06T 5/50 |
| 2020/0234080 A1 * | 7/2020 | Ciller Ruiz | G06K 9/62 |
| 2020/0286214 A1 * | 9/2020 | Kaneko | G06T 11/008 |

\* cited by examiner

METHOD OF AND SYSTEM FOR CUSTOMIZED IMAGE DENOISING WITH MODEL INTERPRETATIONS

CROSS-REFERENCE TO RELATED APPLICATIONS

The present application claims priority on U.S. Provisional Application No. 62/949,740, filed on Dec. 18, 2019.

FIELD

The present technology relates to machine learning algorithms (MLAs) and image processing in general and more specifically to methods and systems for customized image denoising using model interpretability of deep neural networks.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Image denoising problems have been previously addressed with conventional image processing techniques that assume the noise model as an additive white Gaussian noise. However, this assumption ignores the complex noise nature inherent in real camera systems which emerges from multiple sources such as quantum noise, phenomenon in x-ray and CT imaging, thermal, dark and short noise patterns in cameras, speckle noise phenomenon in radar and lidar images, and other in-camera processing issues, as noise is non-stationary and spatial-variant across pixels.

Recently, various supervised machine learning algorithms, more particularly deep convolutional networks (CNNs), have been proposed to remove non-Gaussian noise. In some instances, deep CNNs have proven to be more effective solutions for complex noise reduction compared to conventional methods. However, some deep CNN solutions are still struggling in solving the problem of over-smoothing the high-frequency information while removing the noise. In some instances, the final results of denoised images are too blurry and cannot be exploited in real-world applications, as an example in diagnosis from medical images.

SUMMARY

It is an object of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that to leverage the benefits of deep learning techniques in removing sophisticated noise in real-world images, the over-smoothing issues need to be addressed.

Developers have theorized that over smoothing issues may be addressed by training multiple image denoising models with different configurations of hyperparameters while enforcing the error between a noise-free image and the models' outputs to obtain sparse representations. Developers have appreciated that these sparse representations could be used for defining interpretable measures for customizing the image denoising models.

The present technology provides model customization by enabling the user to tune denoising for a particular noisy image and/or adapt (as appropriate) the signal's power (e.g., increase the amount of ionizing radiations for x-ray sensors) to get higher image rendering. The present technology enables interpretation of the image denoising models by introducing new image quality metrics which in one hand guide the user's action and in other hand improve the performance of the image denoising model during the training process.

The present technology may be used for blind image denoising of complex noise patterns inherent in real-world sensors, such as x-rays, computational tomography (CT) scanners, radars, and LIDARs.

Thus, one or more embodiments of the present technology are directed to a computer-implemented method of and a system for customized image denoising with model interpretations.

In accordance with a broad aspect of the present technology, there is provided a computer-implemented method for training a deep neural network for denoising an image acquired by an imaging apparatus, the computer-implemented method being executed by a processor, the processor having access to a set of machine learning algorithms comprising: the deep neural network, and a neural network having been trained to determine a quality metric of a denoised image generated by the deep neural network. The computer-implemented method comprises obtaining a set of image patch pairs, each image patch pair comprising a noisy image patch and a corresponding clean image patch, the set of image patch pairs having been generated from a plurality of images having been acquired by the imaging apparatus, generating, a training dataset from the set of image patch pairs, training the deep neural network on the training dataset to denoise a noisy image patch in a given image patch pair by generating a denoised image patch similar to a corresponding clean image patch in the given image patch pair, the training comprising: determining a structured covariance score based on sparse conditional correlations, the structured covariance score being indicative of a performance of the deep neural network in recovering content of corresponding clean image patches relative to the denoised image patches of the training dataset, denoising, using the deep neural network, a test noisy image to generate a test denoised image, obtaining a user feedback score of the test denoised image, the user feedback score being indicative of a user satisfaction of a performance of the deep learning network in denoising the test noisy image. The computer-implemented method comprises obtaining a quality metric of the test denoised image, the quality metric having been determined using the neural network, the quality metric being indicative of a quality of the test denoised image generated by the deep learning network based on the test noisy image. The computer-implemented method comprises determining a quality parameter of the deep learning network based on the determined structured covariance score and the obtained quality metric, and if the determined quality parameter is above the obtained user feedback score, providing the trained deep neural network.

In one or more embodiments of the computer-implemented method, the training of the deep learning network comprises, prior to the determining of the structured covariance score: determining the sparse conditional correlations, the sparse conditional correlations being an inverse covariance matrix mapping residues between the denoised image patches and the corresponding clean image patches, the inverse covariance matrix being indicative of a structure of the mapped residues during the training of the deep learning network.

In one or more embodiments of the computer-implemented method, the determining of the structured covariance score based on the inverse covariance matrix comprises quantifying, for each area of non-zero elements in the inverse covariance matrix, a respective spatial density and a respective spatial extent thereof, and calculating a sum of the respective spatial extents weighted by the respective spatial densities.

In one or more embodiments of the computer-implemented method, the determining of the quality parameter comprises calculating a weighted sum of the determined structured covariance score and the obtained quality metric.

In one or more embodiments of the computer-implemented method, the computer-implemented method further comprises, prior to the obtaining of the set of image patch pairs, obtaining the set of images acquired by the imaging apparatus, and preprocessing and segmenting the obtained set of images to obtain the set of image patch pairs.

In one or more embodiments of the computer-implemented method, the denoising, using the deep neural network, of the test noisy image to generate the test denoised image comprises generating, a set of test image noisy patches from the test noisy image, denoising, using the deep neural network or, each test image noisy patch of the set of test noisy image patches to generate a respective denoised image patch of a set of test denoised image patches, and generating the test denoised image based on the set of test denoised image patches.

In one or more embodiments of the computer-implemented method, the generating of the training dataset from the set of image patch pairs comprises generating a non-overlapping validation dataset and a testing dataset from the set of image patch pairs, the testing dataset comprising the test images, the training of the deep neural network further comprises: fine-tuning a set of hyperparameters of the deep neural network on the validation dataset.

In one or more embodiments of the computer-implemented method, if the determined quality parameter is below the obtained user feedback score, the method comprises providing one of an indication to modify at least one acquisition parameter of the imaging apparatus, and an indication to modify at least one hyperparameter of the set of hyperparameters of the deep neural networks.

In one or more embodiments of the computer-implemented method, the computer-implemented method further comprises receiving an indication of a modified hyperparameter in the set of hyperparameters, and generating another validation dataset from the set of image patch pairs, and fine-tuning the deep neural network on the other validation dataset using the set of hyperparameters comprising the modified hyperparameter.

In one or more embodiments of the computer-implemented method, the deep neural network is a first deep neural network, the training dataset is a first training dataset having a first noise level, the first training dataset comprising homogenous image patch pairs, the determined structured covariance score is a first determined structured covariance score, the obtained quality metric is a first obtained quality metric, and the determined quality parameter is a first determined quality parameter. The set of machine learning algorithms further comprises a second deep neural network, and the computer-implemented method further comprises generating a second training dataset from the set of image patch pairs, the second training dataset comprising a combination of homogenous image patch pairs having a second noise level and heterogeneous image patch pairs having the second noise level, training the second deep neural network on the second training dataset to denoise a noisy image patch of a given pair in the second training dataset by generating a denoised image patch similar to a corresponding clean image patch in the given image patch pair in the second training dataset, the training comprising determining a second structured covariance score based on a second covariance matrix, denoising, using the second deep neural network, the test noisy image to generate a second denoised test image, obtaining a second quality metric of the second test denoised image, the second quality metric having been determined using the neural network, the second quality metric being indicative of a quality of the second test denoised image generated by the second deep neural network based on the test noisy image. The computer-implemented method comprises determining a second quality parameter of the second deep neural network based on the determined second quality metric and the determined second structured covariance score, and if the determined second quality parameter is above both of the obtained user feedback score and the determined first quality parameter, providing the trained second deep neural network.

In one or more embodiments of the computer-implemented method, if the determined first quality parameter is above the determined second quality parameter, the computer-implemented method comprises providing the trained first deep neural network.

In one or more embodiments of the computer-implemented method, the deep neural network comprises an inception model and the quality metric comprises an inception score.

In one or more embodiments of the computer-implemented method, the imaging apparatus comprises one of a computational tomography (CT) scanner, an x-ray apparatus, a LIDAR, and a RADAR.

In one or more embodiments of the computer-implemented method, the deep neural network comprises a convolutional neural network.

In one or more embodiments of the computer-implemented method, the training of the convolutional neural network is performed using an objective function comprising a reconstruction loss and an interpretability loss based on the inverse covariance matrix.

In one or more embodiments of the computer-implemented method, the deep neural network comprises a generative adversarial network.

In one or more embodiments of the computer-implemented method, the training of the generative adversarial network is performed using an objective function comprising a reconstruction loss, an adversarial loss, and an interpretability loss based on the inverse covariance matrix.

In one or more embodiments of the computer-implemented method, the set of machine learning algorithms further comprises a third deep neural network, and the computer-implemented method further comprises generating a third training dataset from the set of image patch pairs, the second training dataset comprising a combination of homogenous image patch pairs having a third noise level and heterogeneous image patch pairs having the third noise level, training the second deep neural network on the third training dataset to denoise a noisy image patch of a given pair in the third training dataset by generating a denoised image patch similar to a corresponding clean image patch in the given image patch pair in the third training dataset, the training comprising determining a third structured covariance score based on a third covariance matrix, denoising, using the third deep neural network, the test noisy image to generate a third denoised test image, obtaining a third quality metric of the third test denoised image, the third quality metric having been determined using the neural network, the third quality metric being indicative of a quality of the third test denoised image generated by the third deep neural network based on the test noisy image. The computer-implemented method comprises determining a third quality parameter of the third deep neural network based on the determined third quality metric and the determined third structured covariance score, and if the determined third quality parameter is above both of the obtained user feedback score and the determined first and second quality parameters, providing the trained third deep neural network.

In accordance with a broad aspect of the present technology, there is provided a computer-implemented method for training a deep neural network for denoising an image acquired by an imaging apparatus, the computer-implemented method is executed by a processor, the computer-implemented method comprises obtaining the deep neural network, obtaining a set of image patch pairs, each image patch pair includes a noisy image patch and a corresponding clean image patch, the set of image patch pairs having been generated from a plurality of images having been acquired by the imaging apparatus, at least a portion of the set of image patch pairs to be used as a training dataset, training the deep neural network on the training dataset to denoise a noisy image patch in a given image patch pair by generating a denoised image patch similar to a corresponding clean image patch in the given image patch pair, the training includes: determining a structured covariance score based on sparse conditional correlations, the structured covariance score is indicative of a performance of the deep neural network in recovering content of corresponding clean image patches relative to the denoised image patches of the training dataset, denoising, using the deep neural network, a test noisy image to generate a test denoised image, obtaining a user feedback score of the test denoised image, the user feedback score is indicative of a user satisfaction of a performance of the deep neural network in denoising the test noisy image. The computer-implemented method comprises obtaining a quality metric of the test denoised image, the quality metric having been determined using a neural network having been trained to determine quality metrics of images, the quality metric is indicative of a quality of the test denoised image generated by the deep neural network based on the test noisy image, determining a quality parameter of the deep neural network based on the determined structured covariance score and the obtained quality metric, and if the determined quality parameter is above the obtained user feedback score, providing the trained deep neural network.

In one or more embodiments of the computer-implemented method, the training of the deep neural network comprises using a set of hyperparameters, and the method further comprises if the determined quality parameter is below the obtained user feedback score, providing one of: an indication to modify at least one acquisition parameter of the imaging apparatus, and an indication to modify at least one hyperparameter of the set of hyperparameters of the deep neural network.

In accordance with another broad aspect of the present technology, there is provided a system for training a deep neural network for denoising an image acquired by an imaging apparatus, the system comprising a processor, the processor having access to a set of machine learning algorithms comprising the deep neural network, and a neural network having been trained to determine a quality metric of a denoised image generated by the deep neural network, the processor being operatively connected to a non-transitory storage medium comprising instructions, the processor, upon executing the instructions, being configured to obtain a set of image patch pairs, each image patch pair comprising a noisy image patch and a corresponding clean image patch, the set of image patch pairs having been generated from a plurality of images having been acquired by the imaging apparatus, generate a training dataset from the set of image patch pairs, train the deep neural network on the training dataset to denoise a noisy image patch in a given image patch pair by generating a denoised image patch similar to a corresponding clean image patch in the given image patch pair, the training comprising determining a structured covariance score based on sparse conditional correlations, the structured covariance score being indicative of a performance of the deep neural network in recovering content of corresponding clean image patches relative to the denoised image patches of the training dataset, denoise, using the deep neural network, a test noisy image to generate a test denoised image, obtain a user feedback score of the test denoised image, the user feedback score being indicative of a user satisfaction of a performance of the deep learning network in denoising the test noisy image. The processor is configured to obtain a quality metric of the test denoised image, the quality metric having been determined using the neural network, the quality metric being indicative of a quality of the test denoised image generated by the deep learning network based on the test noisy image. The processor is configured to determine a quality parameter of the deep learning network based on the determined structured covariance score and the obtained quality metric, and if the determined quality parameter is above the obtained user feedback score, provide the trained deep neural network.

In one or more embodiments of the system, to train the deep learning network, the processor is further configured to, prior to the determining of the structured covariance score determine the sparse conditional correlations, the sparse conditional correlations being an inverse covariance matrix mapping residues between the denoised image patches and the corresponding clean image patches, the inverse covariance matrix being indicative of a structure of the mapped residues during the training of the deep learning network.

In one or more embodiments of the system, the determining of the structured covariance score based on the inverse covariance matrix comprises quantify, for each area of non-zero elements in the inverse covariance matrix, a respective spatial density and a respective spatial extent thereof, and calculate a sum of the respective spatial extents weighted by the respective spatial densities.

In one or more embodiments of the system, the determining of the quality parameter comprises calculating a weighted sum of the determined structured covariance score and the obtained quality metric.

In one or more embodiments of the system, the processor is further configured to, prior to the obtaining of the set of image patch pairs obtain the set of images acquired by the imaging apparatus, and preprocess and segment the obtained set of images to obtain the set of image patch pairs.

In one or more embodiments of the system, to denoise, using the deep neural network, the test noisy image to generate the test denoised image, the processor is further configured to generate, a set of test image noisy patches from the test noisy image, denoise, using the deep neural network or, each test image noisy patch of the set of test noisy image patches to generate a respective denoised image patch of a set of test denoised image patches, and generating the test denoised image based on the set of test denoised image patches.

In one or more embodiments of the system, the generating of the training dataset from the set of image patch pairs comprises generating a non-overlapping validation dataset and a testing dataset from the set of image patch pairs, the testing dataset comprising the test images, the training of the deep neural network further comprises fine-tuning a set of hyperparameters of the deep neural network on the validation dataset.

In one or more embodiments of the system, if the determined quality parameter is below the obtained user feedback score, the processor is configured to provide one of an indication to modify at least one acquisition parameter of the imaging apparatus, and an indication to modify at least one hyperparameter of the set of hyperparameters of the deep neural networks.

In one or more embodiments of the system, the processor is further configured to receive an indication of a modified hyperparameter in the set of hyperparameters, and generate an other validation dataset from the set of image patch pairs, and fine-tune the deep neural network on the other validation dataset using the set of hyperparameters comprising the modified hyperparameter.

In one or more embodiments of the system, the deep neural network is a first deep neural network, the training dataset is a first training dataset having a first noise level, the first training dataset comprising homogenous image patch pairs, the determined structured covariance score is a first determined structured covariance score, the obtained quality metric is a first obtained quality metric, and the determined quality parameter is a first determined quality parameter, and the set of machine learning algorithms further comprises a second deep neural network. The processor is further configured to generate a second training dataset from the set of image patch pairs, the second training dataset comprising a combination of homogenous image patch pairs having a second noise level and heterogeneous image patch pairs having the second noise level, train the second deep neural network on the second training dataset to denoise a noisy image patch of a given pair in the second training dataset by generating a denoised image patch similar to a corresponding clean image patch in the given image patch pair in the second training dataset, the training comprising determining a second structured covariance score based on a second covariance matrix, denoise, using the second deep neural network, the test noisy image to generate a second denoised test image, obtain a second quality metric of the second test denoised image, the second quality metric having been determined using the neural network, the second quality metric being indicative of a quality of the second test denoised image generated by the second deep neural network based on the test noisy image. The processor is configured to determine a second quality parameter of the second deep neural network based on the determined second quality metric and the determined second structured covariance score, and if the determined second quality parameter is above both of the obtained user feedback score and the determined first quality parameter, provide the trained second deep neural network.

In one or more embodiments of the system, if the determined first quality parameter is above the determined second quality parameter the processor is configured to provide the trained first deep neural network.

In one or more embodiments of the system, the deep neural network comprises an inception model, and the quality metric comprises an inception score.

In one or more embodiments of the system, the imaging apparatus comprises one of a computational tomography (CT) scanner, an x-ray apparatus, a LIDAR, and a RADAR.

In one or more embodiments of the system, the deep neural network comprises a convolutional neural network.

In one or more embodiments of the system, the training of the convolutional neural network is performed using an objective function comprising a reconstruction loss, and an interpretability loss based on the inverse covariance matrix.

In one or more embodiments of the system, the deep neural network comprises a generative adversarial network.

In one or more embodiments of the system, the training of the generative adversarial network is performed using an objective function comprising: a reconstruction loss, an adversarial loss, and an interpretability loss based on the inverse covariance matrix.

In one or more embodiments of the system, the set of machine learning algorithms further comprises a third deep neural network, and the processor is further configured to: generate a third training dataset from the set of image patch pairs, the second training dataset comprising a combination of homogenous image patch pairs having a third noise level and heterogeneous image patch pairs having the third noise level, train the second deep neural network on the third training dataset to denoise a noisy image patch of a given pair in the third training dataset by generating a denoised image patch similar to a corresponding clean image patch in the given image patch pair in the third training dataset, the training comprising determining a third structured covariance score based on a third covariance matrix, denoise, using the third deep neural network, the test noisy image to generate a third denoised test image, obtain a third quality metric of the third test denoised image, the third quality metric having been determined using the neural network, the third quality metric being indicative of a quality of the third test denoised image generated by the third deep neural network based on the test noisy image, Definitions In the context of the present specification, the terms "an aspect," "an embodiment," "embodiment," "embodiments,"

"the embodiment," "the embodiments," "one or more embodiments," "some embodiments," "certain embodiments," "one embodiment," "another embodiment" and the like mean "one or more (but not all) embodiments of the present technology," unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
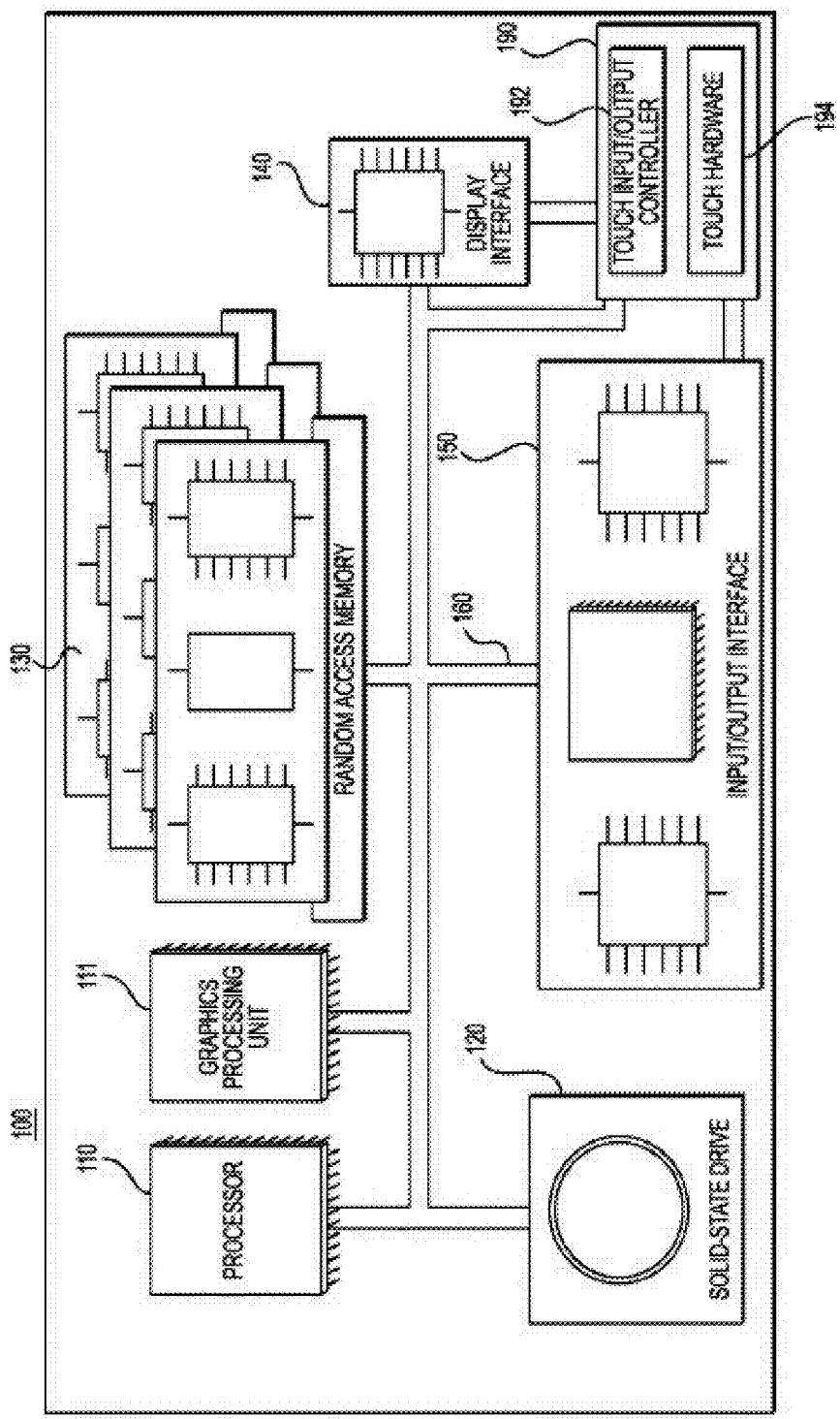
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, some non-limiting examples will now be considered to illustrate various implementations of aspects of the present technology.

Electronic Device

Referring to FIG. 1, there is shown an electronic device 100 suitable for use with one or more implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for training at least one image denoising MLA, customizing the at least one image denoising MLA, and using the at least one image denoising MLA to denoise images. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
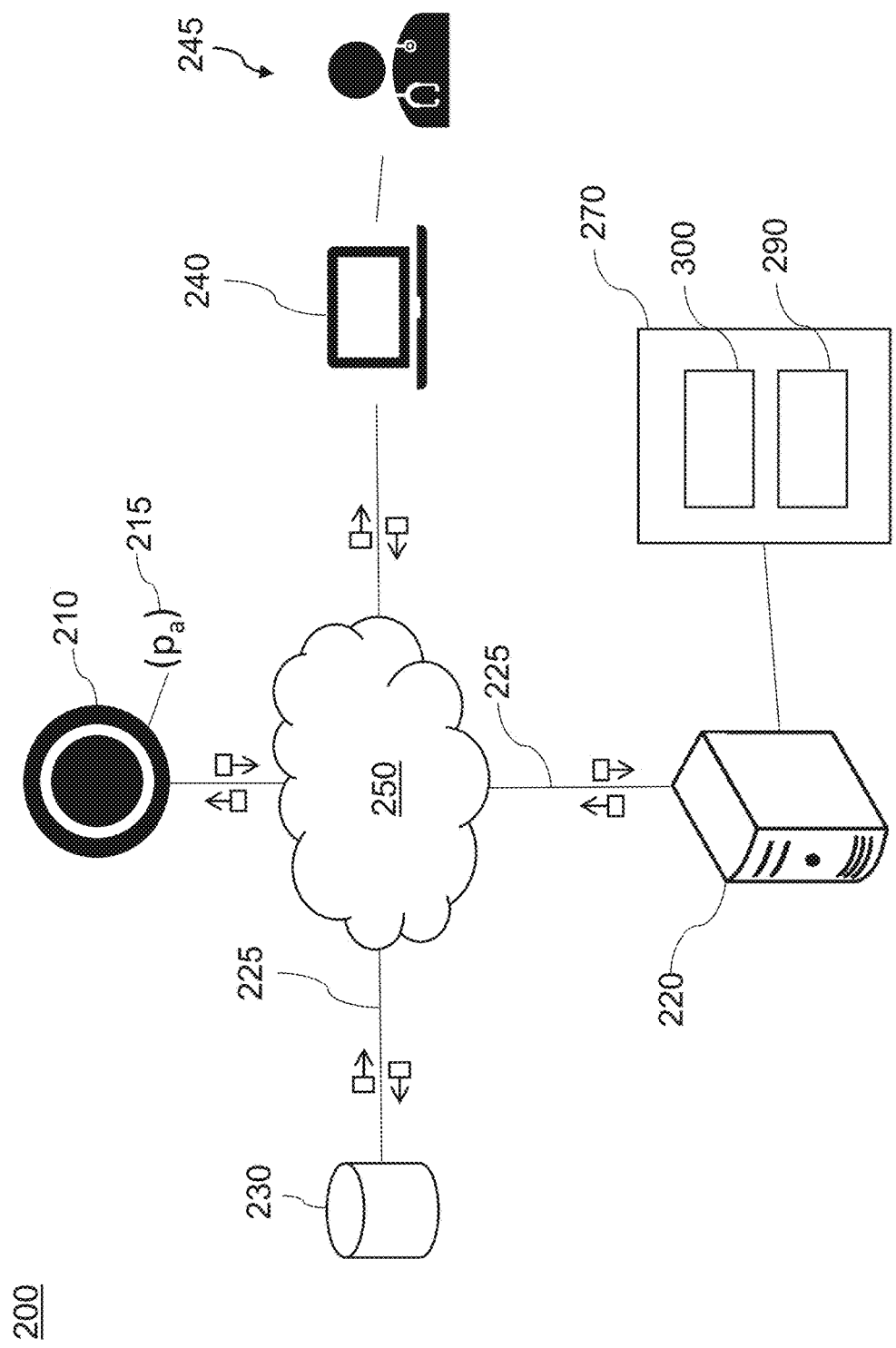
FIG. 2 depicts a schematic diagram of a system in accordance with one or more non-limiting embodiments of the present technology.

Referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will understand, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia an imaging apparatus 210, a training server 220, a database 230, and a user device 240 communicatively coupled over a communications network 250 via respective communication links 225.

Imaging Apparatus

The is imaging apparatus 210 is configured to acquire a plurality of images.

It will be appreciated that the imaging apparatus may be of various types. In fact, the imaging apparatus 210 could be any type of apparatus which acquires images being prone to noise. In one or more embodiments, the imaging apparatus 210 could be a medical imaging apparatus. As a non-limiting example, the imaging apparatus 210 may be one of: an X-ray scanner, a computational tomography (CT) scanner, a magnetic resonance imaging (MRI) scanner, a positron emission tomography (PET) scanner, a 3D ultrasound and the like. In one or more embodiments, the imaging apparatus 210 may be an optical microscope, a radar system, a lidar system, an infrared imaging system, an ultrasound system, a scanning electron microscope (SEM), a transmission electron microscope (TEM) and the like.

The imaging apparatus 210 is configured to acquire a plurality of images according to a set of acquisition parameters 215 The set of acquisition parameters 215 depend on the type of the imaging apparatus 210. The set of acquisition parameters 215 may be modified by a user (not depicted) or by a program executed by an electronic device such that the plurality of images. As a non-limiting example, the set of acquisition parameters 215 may include one or more of: brightness, contrast, aperture, shutter speed, ISO, exposure, and radiation dose.

In one or more embodiments, the imaging apparatus 210 preprocesses the acquired imaging data to generate, via a processor (not depicted), the plurality of images according to known standards, as a non-limiting example the Digital Imaging and Communications in Medicine (DICOM) standard. The imaging apparatus 210 may transmit the plurality of images in the form of data packets (not numbered) to the training server 220 and/or to the database 230 for storage thereof In one or more embodiments, the imaging apparatus 210 stores the acquired imaging data in a raw format, for example in the database 230 or in another non-transitory computer-readable storage medium (not depicted) operatively connected to the imaging apparatus 210.

Training Server

The training server 220 is configured to inter alia: (i) obtain the plurality of images from the imaging apparatus 210; (ii) process the plurality of images to obtain training data in the form of image patch pairs; (iii) access a plurality of MLAs 270 comprising a set of image denoising MLAs 300; (iv) execute a training procedure to train one or more of the set of image denoising MLAs 300 on the image patches pairs to denoise a given image and obtaining a sparse covariance score thereof; (v) use one or more of the set of image denoising MLAs 300 to denoise a test image to obtain a denoised image; (vi) obtain user feedback indicative of a performance of the one or more of the set of image denoising MLAs 300 in denoising the test image; (vii) obtain, from one of the plurality of MLAs 270, a quality metric; and (viii) adjust parameters of the one or more of the plurality of MLAs 270 based on the obtained user feedback.

In one or more embodiments, the training server 220 is further configured to: (ix) obtain a noisy image from the imaging apparatus 210; and (x) access a given one of the image denoising MLAs to denoise the noisy image by generating a synthetic image.

How the training server 220 is configured to do so will be explained in more detail herein below.

It will be appreciated that the training server 220 may be implemented as a conventional computer server and may comprise at least some of the features of the electronic device 100 shown in FIG. 1. In a non-limiting example of one or more embodiments of the present technology, the training server 220 is implemented as a Dell™ PowerEdge™ Server running the Microsoft™ Windows Server™ operating system. Needless to say that the training server 220 may be implemented in any other suitable hardware and/or software and/or firmware or a combination thereof. In the shown non-limiting embodiment of present technology, the training server 220 is a single server. In one or more alternative non-limiting embodiments of the present technology, the functionality of the training server 220 may be distributed and may be implemented via multiple servers (not shown).

The implementation of the training server 220 is well known to the person skilled in the art. However, the training server 220 comprises a communication interface (not shown) configured to communicate with various entities (such as the database 230, for example and other devices potentially coupled to the communication network 250) via the network. The training server 220 further comprises at least one computer processor (e.g., the processor 110 and/or the GPU 111 of the electronic device 100) operationally connected with the communication interface and structured and configured to execute various processes to be described herein.

Plurality of Machine Learning Algorithms (MLAs)

The training server 220 has access to a plurality of machine learning algorithms (MLAs) 270, also know as machine learning models. In one or more embodiments, the training server 220 may execute one or more of the plurality of MLAs 270. In one or more other embodiments, one or more the plurality of MLAs 270 may be executed by another server (not depicted), and the training server 220 may access the one or more of the plurality of MLAs 270 for training by connecting to the server (not shown) via an API (not depicted), and specify parameters of the one or more of the plurality of MLAs, transmit data to and/or receive data from the one or more of the plurality of MLAs 270, without directly executing the one or more of the plurality of MLAs 270.

As a non-limiting example, one or more of the plurality of MLAs 270 may be hosted on a cloud service providing a machine learning API. Non-limiting examples of such services include Amazon™ machine learning API, BigML™, PredictionIO™ Google Cloud™ API, IBM™ Watson™ Discovery API, Kairos™ API, Microsoft™ Azure™ Cognitive Services, Prediction™ IO, and TensorFlow™ API.

The configuration of each of the plurality of MLAs 270 will be explained in more detail herein below with reference to FIG. 3.

The plurality of MLAs 270 includes inter alia a set of image denoising MLAs 300, and a quality evaluation MLA 290. In one or more embodiments of the present technology, the plurality of MLAs 270 further includes MLAs used for preprocessing and/or post processing images (not depicted).

How the set of image denoising MLAs 300 is configured will be explained in more detail herein below with reference to FIG. 3.

Quality Evaluation MLA

The quality evaluation MLA 290 is configured to evaluate a quality of a synthetic image generated by denoising a noisy image by providing a quality metric. In one or more embodiments, the quality evaluation MLA 290 is a neural network having been trained for generating a quality metric for deep neural networks. As a non-limiting example, the quality evaluation MLA 290 comprises an inception model which determines a quality evaluation metric in the form of the inception score.

It will be appreciated that an inception score (IS) is an objective metric for evaluating the quality of generated images, specifically synthetic images output by generative adversarial network models. The inception score involves using a pre-trained deep learning neural network model for image classification to classify the generated images. The inception score has a lowest value of 1.0 and a highest value of the number of classes supported by the classification model, for example, the Inception v3 model supports the 1,000 classes of the ILSVRC 2012 set, and as such, the highest inception score on this set is 1,000.

It will be appreciated that other types of MLAs for evaluating a denoised image by providing a quality metric may be used as the quality evaluation MLA 290.

Database

A database 230 is communicatively coupled to the training server 220 via the communications network 250 but, in one or more alternative implementations, the database 230 may be communicatively coupled to the training server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the training server 220. The database 230 may receive data from the training server 220 for storage thereof and may provide stored data to the training server 220 for use thereof.

In one or more embodiments of the present technology, the database 230 is configured to inter alia: (i) store the plurality of images 510 acquired by the imaging apparatus 210; (ii) store image patch pairs generated from the plurality of images 510; (iii) store training data generated from the image patch pairs; and (iv) store model parameters and hyperparameters related to the plurality of MLAs 270. At least some information stored in the database 230 may be predetermined by an operator and/or collected from a plurality of external resources.

User Device

A user device 240 associated with a user 245 is coupled to the communication network 250.

The user device 240 may be implemented similarly to the electronic device shown in FIG. 1 and comprise one or more components thereof such as: a processor 110, a graphics processing unit (GPU) 111, a solid-state drive 120, a random access memory 130, a display interface 140, and an input/output interface 150.

As a non-limiting example, the user device 240 may be implemented as a desktop computer, a laptop computer, a tablet, or a smart phone.

The user device 240 comprises an input/output interface similar to the input/output interface 150, for example a screen and a keyboard, or a touch screen, which enables the user 245 to view images, such as images acquired by the imaging apparatus 210 and synthetic images generated by the set of image denoising MLAs 300. The user 245 may interact with the input/output interface 150 and may provide an evaluation of the synthetic images generated by the set of image denoising MLAs 300 in the form of a user feedback score. In one or more embodiments, the user 245 has access to parameters for training dataset of image denoising MLAs 300 of the training server 220.

In one or more embodiments, the user device 240 may be a workstation computer associated with the imaging apparatus 210, which may enable controlling one or more of the set of acquisition parameters 215, but this does not need to be so in every embodiment of the present technology.

As a non-limiting example, the user 245 may be a radiologist or a person specialized in analysis of images acquired by the imaging apparatus 210.

Communication Network

In one or more embodiments of the present technology, the communications network 250 is the Internet. In one or more alternative non-limiting embodiments, the communication network 250 may be implemented as any suitable local area network (LAN), wide area network (WAN), a private communication network or the like. It will be appreciated that implementations for the communication network 250 are for illustration purposes only. How a communication link 225 (not separately numbered) between the training server 220, the database 230, and/or another electronic device (not shown) and the communications network 250 is implemented will depend inter alia on how each electronic device is implemented.

Denoising Machine Learning Algorithms (MLAs)

Figure 3:
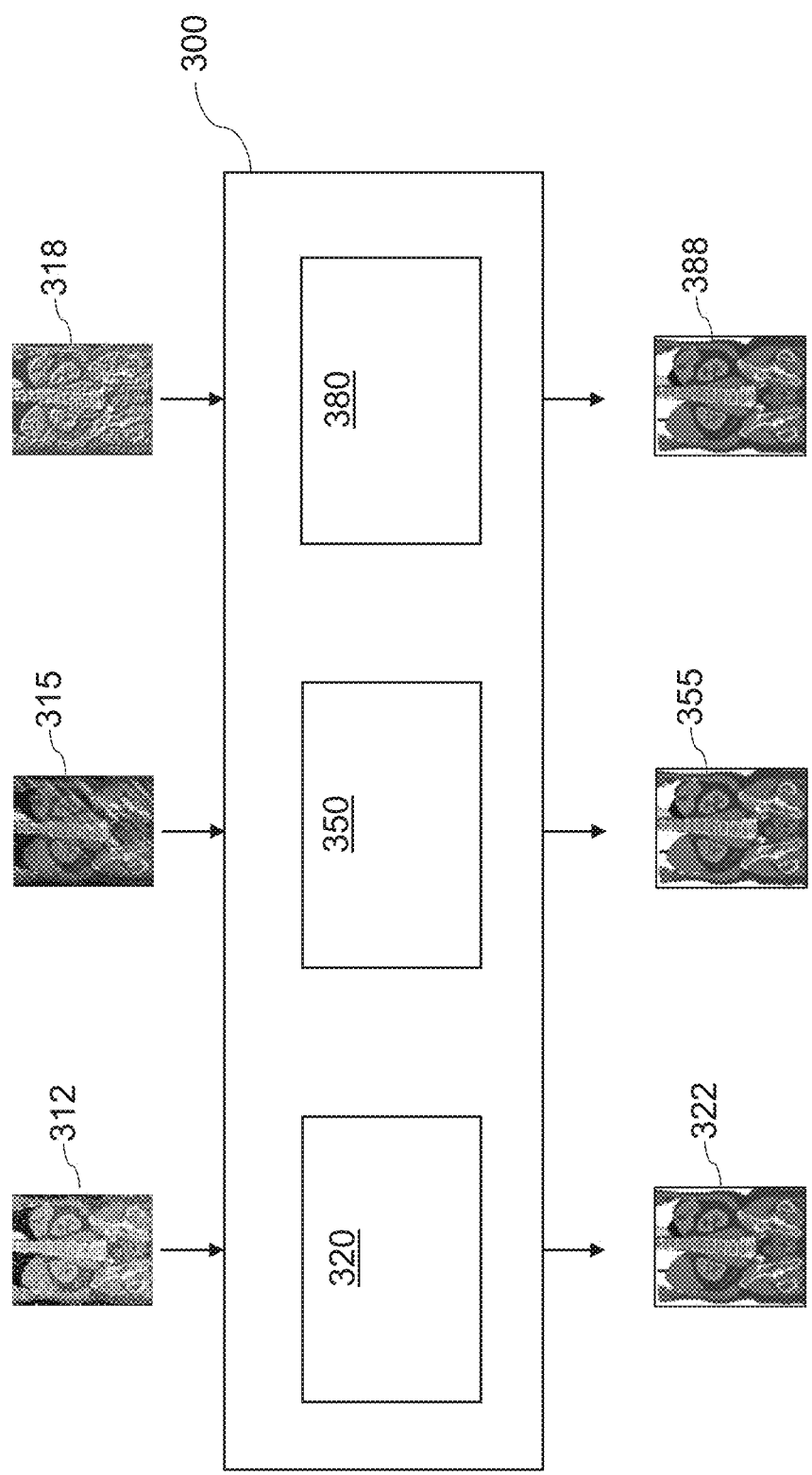
FIG. 3 depicts a schematic diagram of a set of image denoising machine learning algorithms (MLA) in accordance with one or more non-limiting embodiments of the present technology.

With reference to FIG. 3, there is shown a schematic diagram of a set of image denoising machine learning algorithms (MLAs) 300 in accordance with one or more non-limiting embodiments of the present technology.

The set of image denoising MLAs 300, also known as the set of image denoising ML models 300, is executed by the training server 220. It will be appreciated that the set of image denoising MLAs 300 may be accessible to the training server 220 via an API of a cloud server providing machine learning algorithms.

As depicted in FIG. 3, the set of image denoising MLAs 300 comprises a first image denoising MLA 320, a second image denoising MLA 350, and a third image denoising MLA 380.

After undergoing a training procedure, a given image denoising MLA 320, 350, 380 is configured to inter alia: (i) obtain a respective noisy image 312, 315, 318 having been acquired by the imaging apparatus 210; and (ii) denoise the respective noisy image 312, 315, 318 by generating a respective synthetic image 322, 355, 388. To achieve that purpose, the given image denoising MLA 320, 350, 380 is trained, validated and tested on respective datasets.

It will be appreciated that the set of image denoising MLAs 300 may comprise a single image denoising MLA, two image denoising MLAs or more than three image denoising MLAs. In one or more embodiments of the present technology, each image denoising MLA of the set of image denoising MLAs 300 is configured to denoise a different types of image. In one or more embodiments, the set of image denoising MLAs 300 is trained such that only one of the set of image denoising MLAs 300 will be used for denoising a noisy image after training.

In one or more embodiments, an image is received by the training server 220 with an indication of one or more acquisition parameters of the imaging apparatus 210 for the image, and the training server 220 may chose one of the set of image denoising MLAs 300 for denoising the image based on the one or more acquisition parameters.

Additionally, or alternatively, the training server 220 may process the image to determine a parameter thereof, which enables selecting an image denoising MLA best adapted for denoising the image. As a non-limiting example, a noise level of an image may enable the training server 220 to determine which image denoising MLA of the set of image denoising MLAs to select for denoising the image. It will be appreciated that such parameters may be image acquisition parameters related to the medical imaging apparatus 210 or may be specific parameters determined based the image to denoise, and different thresholds may be associated therewith.

In one or more embodiments, the image is denoised by each of the set of image denoising MLAs to generate a respective synthetic image, and the respective synthetic images are provided to the user for evaluation thereof.

Model Architecture

In the context of the present technology, a given image denoising MLA 320, 350, 380, i.e. any one of first image denoising MLA 320, the second image denoising MLA 350, and the third image denoising MLA 380, is implemented as a deep neural network.

In one or more embodiments, the given image denoising MLA 320, 350, 380 is convolutional neural network (CNN)-based and comprises one or more CNNs. In one or more embodiments, the given image denoising MLA 320, 350, 380 is a generative adversarial network comprising one or more CNNs. In one or more other embodiments, the given image denoising MLA 320, 350, 380 is an encoder-decoder network comprising one or more CNNs. In one or more alternative embodiments, the given image denoising MLA 320, 350, 380 may be a denoising autoencoder (DAE) network. As a non-limiting example, the given image denoising MLA 320, 350, 380 may have a U-Net architecture.

Training

To denoise a respective noisy image 312, 315, 318 by generating a respective synthetic image 322, 355, 388, each of the first image denoising MLA 320, the second image denoising MLA 350, and the third image denoising MLA 380 undergo a respective training procedure, a respective validation procedure, and a respective testing procedure, which will be explained in more detail herein below with reference to FIG. 5.

It will be appreciated that the training procedure depends on the type and architecture of the set of image denoising MLAs 300.

A given image denoising MLA 320, 350, 380 is configured to be trained according to inter alia (i) a respective set of model parameters; (ii) a respective set of hyperparameters; and (iii) an objective function.

It will be appreciated that the respective set of model parameters (not depicted) are configuration variables of the given image denoising MLA 320, 350, 380 required to perform predictions and which are estimated or learned from training data, i.e. the coefficients are chosen during learning based on an optimization strategy for outputting the prediction, generally without human intervention. As a non-limiting example, the model parameters for a neural network may include weights associated with neurons in each layer.

The set of hyperparameters (not depicted) are elements that may be set by an operator and which may not be updated by the given image denoising MLA 320, 350, 380 during training. In one or more embodiments, the hyperparameters include one or more of: a number of hidden layers, an optimization algorithm, a learning rate, an activation function, a minibatch size, a number of epochs, and dropout.

The activation function, also known as transfer function, determines if a neuron in a deep neural network should be activated or not, i.e. whether the information the neuron is receiving is relevant for the task or it should be ignored. The activation function performs a non-linear transformation over the input signal of a neuron, which is sent to the next layers of neurons as an input.

Non-limiting examples of activation functions include: a sigmoid function, a softmax function, a tanh function, and a ReLu function.

Objective Function

Each of the set of image denoising MLAs 300 is trained to optimize an objective function, i.e. maximize or minimize the objective function. For example, the given image denoising MLA 320, 350, 380 may be trained to minimize an error or an estimate of the error which is modeled by the objective function or loss function.

In the context of image denoising, the loss and model objective function comprises a reconstruction loss function, defined as the pixel-wise mean square error, which is expressed by equation (1):

$$\mathcal{L}_{rec} = \|x_o - x_{gt}\|^2 \quad (1)$$

Where $\mathcal{L}_{rec}$ is the reconstruction loss, $x_o$ is a matrix of output pixel values of the denoised or synthetic image, and $x_{gt}$ is a matrix of output pixel values of the clean or ground-truth image.

The objective function comprises a content loss, which is a regularization term for the reconstruction loss and which takes into account over-smoothing and degradation of the quality of the synthetic image due to the reconstruction loss. The content loss minimizes the errors of features vectors between the synthetic image and clean or ground-truth images. In one or more embodiments, the feature vectors are obtained by propagating feedforward each of the matrix of output pixel values $x_o$ of the synthetic image, and the matrix of output pixel values $x_{gt}$ of the clean or ground-truth image in a pre-trained deep CNN network such as VGG. The content loss is expressed by equation (2):

$$\mathcal{L}_{cont} = \|v_{gg}(x_o) - v_{gg}(x_{gt})\|^2 \quad (2)$$

where $\mathcal{L}_{cont}$ is the content loss, $v_{gg}(x_o)$ is the feature matrix oft the synthetic image output by the VGG, and $x_{gt}$ is the feature matrix of the clean or ground-truth image output by the VGG. It will be appreciated that neural networks other than VGG may be used.

For CNN-based neural networks, the overall objective function is expressed by equation (3):

$$\mathcal{L} = \mathcal{L}_{rec} + \lambda_{cont} \mathcal{L}_{cont} \quad (3)$$

where $\mathcal{L}_{rec}$ is the reconstruction loss, $\mathcal{L}_{cont}$ is the content loss and $\lambda_{cont}$ is a content regularization parameter.

It will be appreciated that for generative adversarial networks (GANs), the optimization objective is to train the discriminator of the GAN expressed as D in distinguishing between synthetic images and clean images by optimizing a min-max loss, also known as adversarial loss function. The Wasserstein distance is used to compute the error between the generator of the GAN expressed as G and the ground-truth distributions, while a gradient penalty is used as a regularization for stabilization during the training. The adversarial loss function is expressed by equation (4):

$$\mathcal{L}_{adv} = \quad (4)$$

$$\min_G \max_D \left( \mathbb{E}_{x_o \sim \mathbb{P}_g}[D(x_o)] - \mathbb{E}_{x_{gt} \sim \mathbb{P}_r}[D(x_{gt})] + \lambda \mathbb{E}_{\hat{x} \sim \mathbb{P}_{\hat{x}}}\left[(\|\nabla_{\hat{x}} D(\hat{x})\|_2 - 1)^2\right] \right)$$

$$\hat{x} = tx_o + (1-t)x_{gt}, \ 0 \le t \le 1$$

Where $\mathcal{L}_{adv}$ is the adversarial loss, $x_o$ is the matrix of output pixel values of the synthetic image, and $x_{gt}$ is the matrix of output pixel values of the clean or ground-truth image.

It will be appreciated that the overall objective function for a GAN can be expressed by equation (5)

$$\mathcal{L} = \mathcal{L}_{adv} + \lambda_{cont} \mathcal{L}_{cont} \quad (5)$$

It should be noted that the content loss in equation (2) encourages preserving the structural information while denoising using one of the objectives in equation (3) or equation (5). However, the content loss cannot guarantee recovering all content details since the features obtained by the feature extraction CNN network (e.g. the VGG network) become compressed representations of the content after many convolution and pooling operations. These representations may describe or be indicative of the global similarity between contents but may not enable revealing the similarities between the details. On the other hand, a CNN denoising model is not interpretable since it is defined in a large (redundant) parameter space.

Thus, in the context of the set of image denoising MLAs 300, model interpretation is enabled by using a sparse covariance matrix, and a sparsity score.

Inverse Covariance Matrix

To enable model interpretation of the set of image denoising MLAs 300, changes in the covariance matrix of the error map, i.e. the residues between synthetic images and corresponding clean images are tracked by the training server 220 during training of the set of image denoising MLAs 300. More specifically, the training server 220 is configured to track changes in the structured correlations or conditional correlations of errors variables instead of focusing on the marginal correlation of error variables. In order to capture the conditional correlations among neighboring pixels in a given image patch, the training server 220 is configured according to a sparsity assumption, where a majority of elements that are off the diagonals in the covariance matrix are assumed to be nearly zero. In optimal scenarios, if the given image denoising MLA 320, 350, 380 succeeds in recovering a majority of the content of the clean image patch in the synthetic image patch, the mapping of the errors should approximate to a white gaussian noise. In one or more embodiments, to estimate the sparse conditional correlations, i.e., the inverse covariance matrix the graphical lasso optimization is used during training, which is expressed by equation (6):

$$\hat{\Sigma} = \arg\min_{\Sigma^{-1}}\left(\log \det \Sigma^{-1} + Tr\left(\Sigma^{-1} S\right) + \lambda_{sp} \|P \odot \Sigma^{-1}\|_1 \right) \quad (6)$$

$$\text{s.t. } \Sigma^{-1} > 0$$

where $\hat{\Sigma}$ is the estimated inverse covariance matrix, P is a matrix with zero elements along the diagonal, $$P_{ij} = \frac{1}{s_{ij}}$$

for $i \ne j$, and S is the marginalized covariance matrix of the error map.

The inverse covariance matrix is a representative signature of the behavior of the given image denoising MLA 320, 350, 380 as the sparse inverse covariance matrix captures the structures remaining in the residue map during training of the given image denoising MLA 320, 350, 380. Thus, an inverse covariance matrix may be calculated for each of the set of image denoising MLAs 300 during training by the training server 220.

In one or more embodiments, it will be appreciated that the inverse covariance matrix could be combined with image processing and coloring methods to indicate the behavior of the model in a human-understandable format, which enables interpreting the behavior of a given image denoising MLA 320, 350, 380.

The sparsity of the inverse covariance matrix measures the number of non-zero elements in the inverse covariance matrix. Equation (6) provides a sparse matrix which has one value on the diagonal and regions of connected pixels with values that vary between zero and one. Minimizing the sparsity enables more independence between pixels in the error map, and thus enables recovering more image content in the denoised image, in contrast to not minimizing the sparsity.

Thus, a sparse penalty in the denoising objective function may be introduced as regularization to constrain less sparsity of the inverse covariance matrix.

In one or more embodiments, where the given image denoising MLA 320, 350, 380 is implemented as a GAN, the objective function may be expressed by equation (7):

$$\mathcal{L}=\mathcal{L}_{adv}+\lambda_{rec}\mathcal{L}_{rec}+\lambda_{sp}\|\tilde{\Sigma}\| \tag{7}$$

with $$\tilde{\Sigma}=P\odot\hat{\Sigma} \tag{8}$$

where $\lambda_{err}$ and $\lambda_{rec}$ are regularization parameters that indicate the tradeoff between the pixel-wise reconstruction loss and partial correlations sparsity, and P is a matrix of zero value along the diagonal and one otherwise. In the objective function of equation (7), the sparse penalty acts a content loss.

In one or more embodiments where the set of image denoising MLAs 300 are CNN-based, the objective function of equation (7) can be used with $\lambda_{rec}=1$ and $\mathcal{L}_{adv}=0$, which is expressed by equation (9):

$$\mathcal{L}=\mathcal{L}_{rec}+\lambda_{sp}\|\tilde{\Sigma}\| \tag{9}$$

Thus, during training of the set of image denoising MLAs 300, two objectives are minimized: an objective for denoising and an objective for sparse covariance estimation.

It will be appreciated that in one or more embodiments, to avoid slowing down training of given image denoising MLA 320, 350, 380 or make the optimization of equation (6) intractable, covariance from all training examples may not be estimated. A small subset of examples (e.g., m=100) may be used and the error maps may be computed and equation (6) may be used to estimate the covariance at every iteration.

Evaluation Metrics

The training server 220 is configured to obtain evaluation metrics that correlate with human qualification of image quality during training and testing of the set of image denoising MLAs 300.

Quality Metric

The training server 220 is configured to obtain a quality metric of the given image denoising MLA 320, 350, 380 by using the quality evaluation MLA 290. In one or more embodiments, where the quality evaluation MLA 290 is implemented as an inception network, the training server 220 obtains the inception score (IS), which measures the difference of outputs of the inception network between denoised and ground truth images or clean images.

Structured Covariance Score

The training server 220 is configured to calculate a structured covariance score (SCS), which is indicative of the ability of a given image denoising MLA 320, 350, 380 in recovering content of an image by denoising a noisy image to generate the synthetic image. The structured covariance score is calculated based on the sparse inverse covariance matrix.

More specifically, the structured covariance score (SCS) can be calculated by: (i) element-wise multiplying the sparse inverse covariance matrix with a matrix of zero-diagonal and ones else where, which masks element on the diagonal of the sparse inverse covariance matrix; (ii) detecting each non-zero regions in the masked covariance and quantify the respective density and the respective spatial extent or area of each of the non-zero regions; and (iii) calculating a weighted sum of the spatial extents, where each respective spatial extent is weighted by its respective density.

It will be appreciated that lower SCS scores indicate fewer structures in the sparse covariance of the residue map, while higher SCS score indicate more structures in the sparse covariance of the residue map. Thus, a lower SCS score is generally preferable.

The training server 220 is configured to generate a quality parameter of the given image denoising MLA 320, 350, 380 by calculating using the quality metric and the structured covariance score. In one or more embodiments, the training server 220 may calculate the quality parameter by calculating a weighted sum of the quality metric and the structured covariance score.

The quality parameter may then be directly compared with a user's feedback with regard to a quality of an image having been denoised by the given image denoising MLA 320, 350, 380.

Thus, one or more of the set of image denoising MLAs 300 may be implemented as CNN-based networks or GAN-based networks, and may be trained such that an objective for denoising and an objective for sparse covariance estimation are optimized. During training, the training server 220 is configured, for a given image denoising MLA 320, 350, 380, to output a inverse covariance matrix which enables interpreting the given image denoising MLA 320, 350, 380, and a structured covariance score which provides an evaluation metric of the given image denoising MLA 320, 350, 380.

Figure 4:
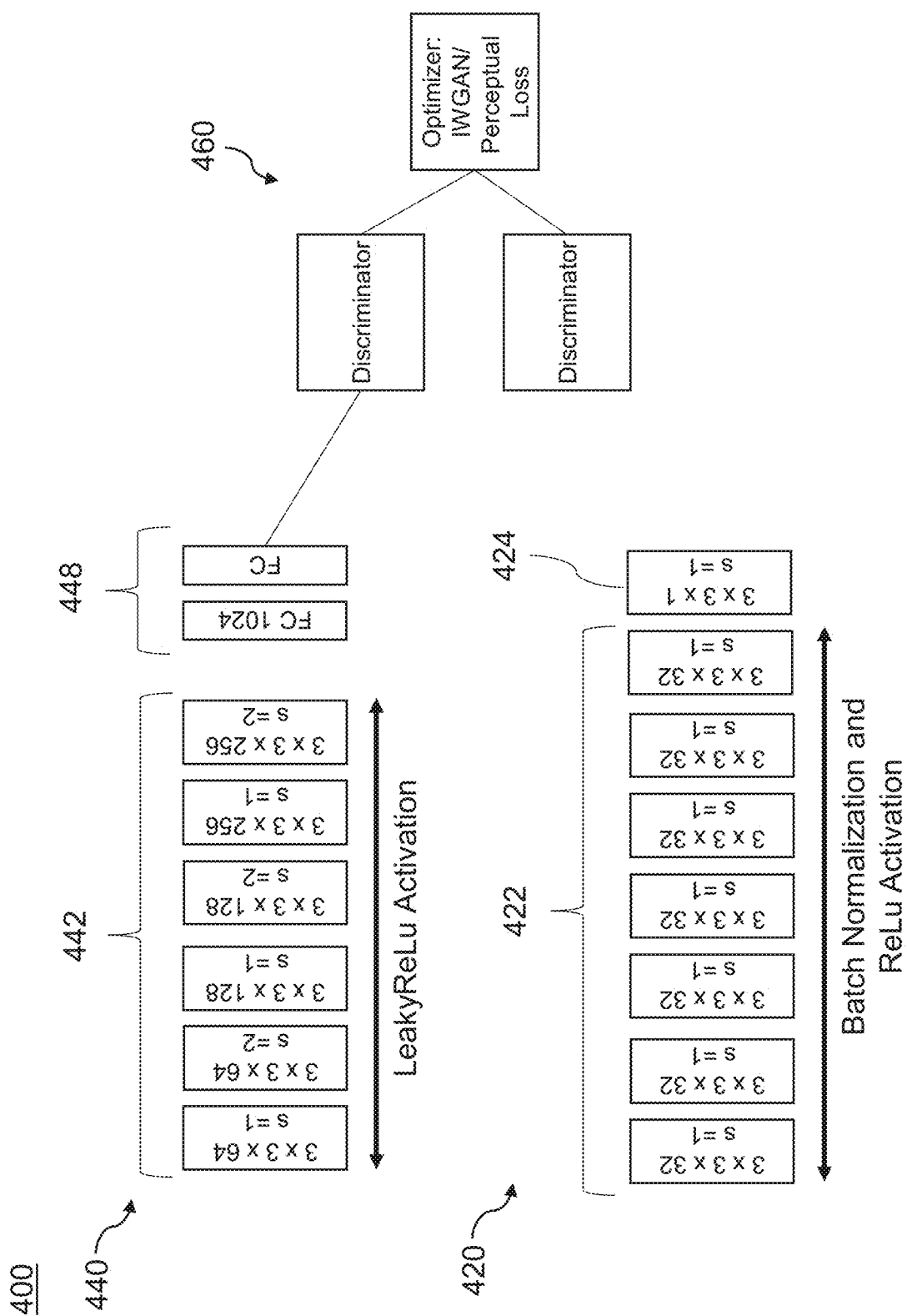
FIG. 4 depicts a schematic diagram of a generative adversarial network with interpretability used as an image denoising MLA with interpretability in accordance with one or more non-limiting embodiments of the present technology.

Now turning to FIG. 4, there is depicted a schematic diagram of a given image denoising MLA 320, 350, 380 implemented as a generative adversarial network (GAN) 400 in accordance with one or more non-limiting embodiments of the present technology.

Generative Adversarial Network

A GAN comprises a generator 420, a discriminator 440, and an optimizer 460.

The generator 420 is configured to take a fixed-length random vector as an input and to generate a sample in the domain. The vector is drawn randomly from a Gaussian distribution, and the vector is used to seed the generative process. After training, points in this multidimensional vector space will correspond to points in the problem domain, forming a compressed representation of the data distribution.

The discriminator 440 is configured to take an example from the domain as an input (real or generated) and predict a binary class label of real or fake (generated).

The two models, the generator 420 and the discriminator 440, are trained together on a training dataset, the training dataset comprising pairs of noisy and clean image patches.

The generator 420 generates a batch of synthetic or denoised image patches from the noisy image patches, and these, along with real examples from the domain, i.e. the clean or ground truth image patches, are provided to the discriminator 440 which classifies them as real or fake.

The discriminator 440 is then updated to get better at discriminating real and fake samples in the next round, and importantly, the generator 420 is updated based on how well, or not, the generated samples fooled the discriminator 440.

In the non-limiting embodiment depicted in FIG. 4, the GAN 400 is used for low-dose CT image denoising, the generator 420 is implemented as first CNN-based network, and the discriminator 440 is implemented as a second CNN-based network.

The generator 420 comprises 8 layers, where the first seven consecutive layers 422 include 32 channels and the last layer 424 includes one/three channels to generate grayscale/colored denoised images. All the layers 422, 424 have a filter size of 3×3 with stride=1, and a ReLU activation function is applied after every convolutional layer. The generator 420 takes the noisy image as input and generates on the output a denoised or synthetic image.

The discriminator 440 comprises six convolutional layers 442 followed by two fully connected (FC) layers 448 to estimate the probability of discriminating noise-free and denoised images. The six convolutional layers 442 are composed of (64, 64, 128, 128, 256, 256) channels. All six convolutional layers 442 have a filter of size 3×3 applied with strides=(1, 2, 1, 2, 1, 2) respectively for each of the 6 convolutional layers 442. The LeakyReLU activation function is applied after every convolutional layer. The output of the last convolutional layer is converted to a one-dimensional vector and fed to a dense fully connected layer (FCL) of 1024 units followed by a LeakyReLU activation function. The last layer is a single output representing the discrimination probability (not illustrated).

The discriminator 440 maps the output of the generator 420 (i.e. synthetic image) or its corresponding ground-truth image (clean image) to a binary decision value (D=1, if the input is a ground-truth image; D=0, if the input is a synthetic image). In the embodiment depicted herein, a batch normalization technique is used before every activation function in the generator 420.

The optimizer 460 minimizes an objective function which comprises WGAN loss and the perceptual loss as defined originally in equation (5). In the context of the present technology, the perceptual loss is replaced by the sparse covariance loss and reconstruction loss as defined in equation (7).

Denoising Training and Customization

Figure 5:
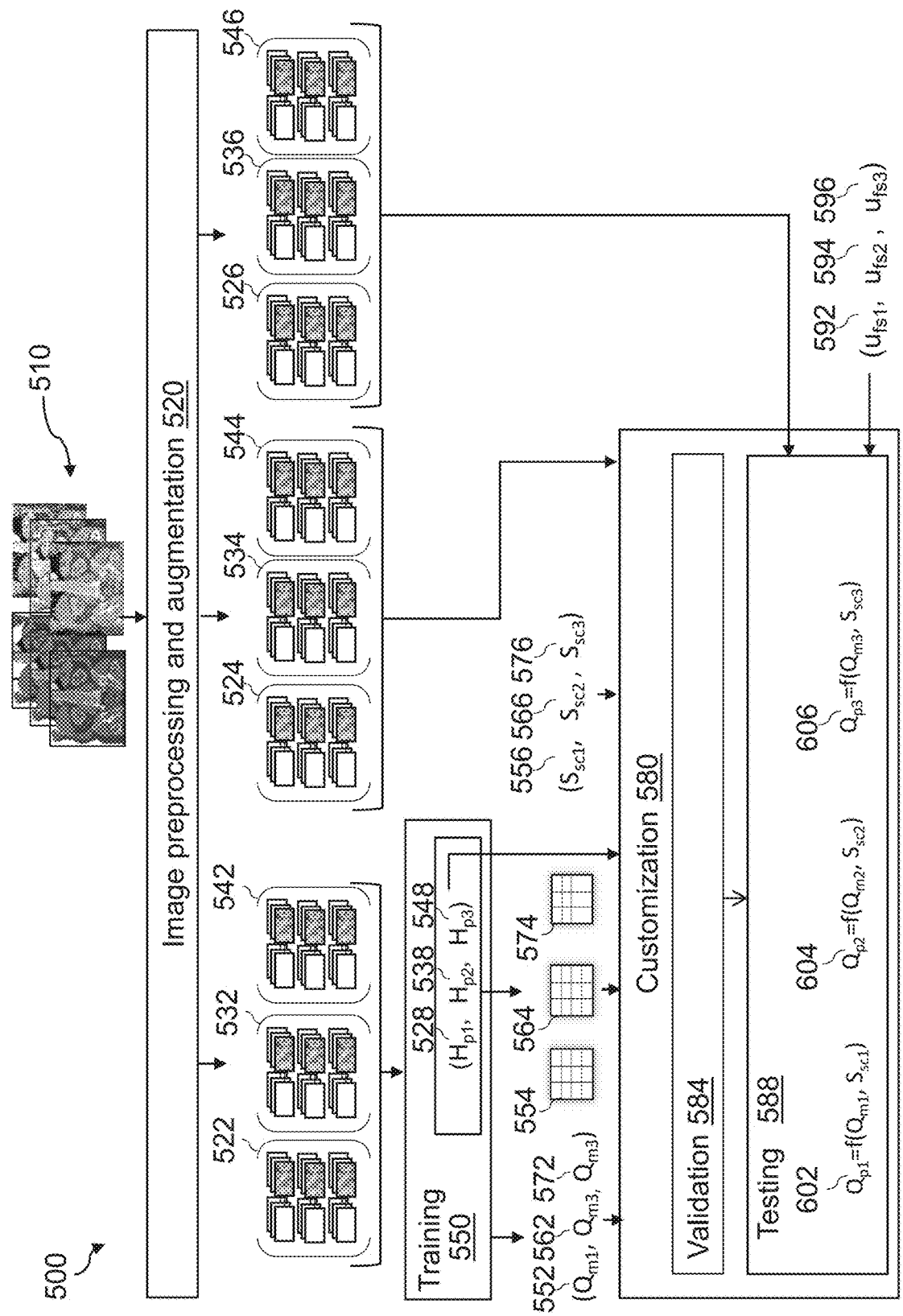
FIG. 5 depicts a schematic diagram of an image denoising and customization procedure in accordance with one or more non-limiting embodiments of the present technology.

Now turning to FIG. 5, there is shown a schematic diagram of an image denoising training and customization procedure 500 in accordance with one or more non-limiting embodiments of the present technology.

The image denoising training and customization procedure 500 may be executed for the set of image denoising MLAs 300 by the training server 220. It is contemplated that the image denoising training and customization procedure 500 may be executed in sequence for each of the set of image denoising MLAs 300, at different times, or in parallel. It will be appreciated that the image denoising training and customization procedure 500 could be executed for any number of image denoising MLAs 300 without departing from the scope of the present technology.

The image denoising training and customization procedure 500 includes inter alia an image preprocessing and augmentation procedure 520, a training procedure 550, and a customization procedure 580.

Image Preprocessing and Augmentation

The image preprocessing and augmentation procedure 520 is configured to inter alia: (i) obtain the plurality of images 510 acquired by the imaging apparatus 210; (ii) preprocess a portion of the plurality of images 510 by decomposing and pairing noisy images and clean images; (iii) generate training pairs, validation pairs, and testing pairs from the pairs of noisy and clean images; (iv) augment and normalize the training pairs, validation pairs, and testing pairs to obtain respective training datasets, validation datasets and testing datasets for a respective image denoising MLA of the set of image denoising MLAs 300.

The image preprocessing and augmentation procedure 520 is executed by the training server 220. In one or more other embodiments, the image preprocessing and augmentation procedure 520 may be executed by another server, and the respective training datasets, the respective validation datasets and the respective testing datasets may be directly obtained by the training server 220.

The image preprocessing and augmentation procedure 520 obtains the plurality of images 510 which have been acquired by the imaging apparatus 210. In one or more embodiments, the image preprocessing and augmentation procedure 520 has access to one or more algorithms known in the art for preprocessing and augmenting the plurality of images 510.

The plurality of images 510 comprises images having been acquired by the imaging apparatus 210 of different targets, and/or by using different acquisition settings and/or by using different noise levels. As a non-limiting example, the plurality of images 510 may comprise noisy low-dose x-ray sequences of phantom and cadaver examples, as well as clean image which will be used as ground-truth images for training the set of image denoising MLAs 300.

In one or more embodiments, if the plurality of images 510 or a portion thereof are multichannel images or images having been acquired during a period of time, the image preprocessing and augmentation procedure 520 decomposes the multichannel images and/or images in the time domain to obtain single 2D images.

In one or more embodiments, image preprocessing and augmentation procedure 520 removes irrelevant images in the plurality of images 510, i.e. images irrelevant for training, validating and testing the set of image denoising MLAs 300.

The image preprocessing and augmentation procedure 520 is configured to generates pairs of images from the plurality of images, where each pair of image comprises a respective noisy image, and a corresponding respective clean image. The noisy image is an image of a target having been acquired by the imaging apparatus 210 and which comprises random variations of brightness and/or color, which reduces image quality and impact visibility of features of the target in the image. Noise may be due to a variety of factors, such as, but not limited to, quantum noise, receptor sensitivity, electronic noise, and the like. The corresponding clean image is an image of the same target, but which comprises less noise, and which will be considered ground-truth for training the given image denoising MLA 320, 350, 380. The noisy image and/or clean image may have been generated by changing acquisition parameters of the imaging apparatus 210 or by digital processing for example.

The image preprocessing and augmentation procedure 520 uses patch augmentation techniques to generate sets of image patches pair for each image pair. As a non-limiting example, the image preprocessing and augmentation procedure 520 may generate patches such that each patch is of size 128×128 with a 50% overlap.

The image preprocessing and augmentation procedure 520 then normalizes the image patches pair included in the first training image set (not depicted), the first image validation dataset (not depicted), and the first image testing dataset (not depicted). The image preprocessing and augmentation procedure 520 normalizes each of the patches such that intensity values vary in the range [0,1].

The image preprocessing and augmentation procedure 520 generates, for the first image denoising MLA 320, the second image denoising MLA 350 and the third image denoising MLA 380: a first image denoising set (not numbered), a second image denoising set (not numbered), and a third image denoising set (not numbered) respectively. In one or more embodiments, after removing outlier images and segmenting, the image preprocessing and augmentation procedure 520 splits the plurality of images 510 in three portions for each of the first image denoising set, the second image denoising set and the third image denoising set.

As a non-limiting example, each of the first image denoising set, the second image denoising set and the third image denoising set comprise a respective training dataset which comprises 80% of a respective portion of the plurality of images, the respective validation dataset which comprises 10% of the respective portion of the plurality of images, and the respective testing dataset which comprises 10% of the respective portion of the plurality of images. The respective training datasets and the respective validation dataset are used to train and fine-tune the set of image denoising MLAs 300, and the respective testing dataset is used to evaluate the performance of the set of image denoising MLAs 300 after training.

The image preprocessing and augmentation procedure 520 generates, for the first image denoising MLA 320, the first image denoising dataset, the first image denoising set comprising a first training image dataset 522, a first image validation dataset 524, and a first image testing dataset 526. In one or more embodiments, the image preprocessing and augmentation procedure 520 generates the first training image dataset 522, the first image validation dataset 524, and the first image testing dataset 526 such that each of the first training image dataset 522, the first image validation dataset 524, and the first image testing dataset 526 include homogenous image patch pairs.

The image preprocessing and augmentation procedure 520 generates and outputs, for the second image denoising MLA 350, the second image denoising dataset, the second image denoising dataset comprising a second training dataset 532, a second validation dataset 534, and a second testing dataset 536. In one or more embodiments, the image preprocessing and augmentation procedure 520 generates the second training dataset 532, the second validation dataset 534, and the second testing dataset 536 such that the second training dataset 532, the second validation dataset 534, and the second testing dataset 536 include a first set of heterogeneous image patch pairs.

The image preprocessing and augmentation procedure 520 generates and outputs, for the third image denoising MLA 380, the third image denoising set, the third image denoising set comprising a third training dataset 542, a third validation dataset 544, and a third testing dataset 546. In one or more embodiments, the image preprocessing and augmentation procedure 520 generates the third training dataset 542, the third validation dataset 544, and the third testing dataset 546 such that the third training dataset 542, the third validation dataset 544, and the third testing dataset 546 include a second set of heterogeneous image patch pairs.

Training

The training procedure 550 receives the first training dataset 522, the second training dataset 532, and the third training dataset 542 as an input.

The training procedure 550 initializes: a first set of hyperparameters 528 for the first image denoising MLA 320, a second set of hyperparameters 538 for the second image denoising MLA 350, and a third set of hyperparameters 548 for the third image denoising MLA 380.

The training procedure 550 trains each of the set of image denoising MLAS 300 to optimize an objective function. It will be appreciated that the set of image denoising MLAs 300 may be trained in parallel, or in sequence at different times without departing of the scope of the present technology.

In one or more embodiments where the set of image denoising MLAs 300 are implemented as GANs, the objective function to optimize during training is expressed by equation (7):

$$\mathcal{L} = \mathcal{L}_{adv} + \lambda_{rec}\mathcal{L}_{rec} + \lambda_{sp}\|\hat{\Sigma}\| \quad (7)$$

with $$\hat{\Sigma} = P \odot \hat{\Sigma} \quad (8)$$

where $\lambda_{err}$ and $\lambda_{rec}$ are regularization parameters that indicate the tradeoff between the pixel-wise reconstruction loss and covariance sparsity, and P is a matrix of zero value along the diagonal and one otherwise. In the objective function of equation (7) the sparse penalty acts a content loss.

In one or more embodiments where the set of image denoising MLAs 300 are CNN-based, the objective function of equation (7) can be used with $\lambda_{rec}=1$ and $\mathcal{L}_{adv}=0$, which is expressed by equation (9):

$$\mathcal{L} = \mathcal{L}_{rec} + \lambda_{sp}\|\hat{\Sigma}\| \quad (9)$$

The training procedure 550 is configured to train the first image denoising MLA 320 on the first training dataset 522 using the first set of hyperparameters 528 until convergence.

The first set of hyperparameters 528 identifies a topology of the first image denoising MLA 320, and learning parameters of the first image denoising MLA 320, the learning parameters including learning rates, optimization parameters, and regularization parameters.

In one or more embodiments, the first set of hyperparameters 528 includes: a batch size m, a number of epochs M, a model architecture of the first image denoising MLA 320, regularization parameters $\lambda$, $\lambda_{rec}$, $\lambda_{err}$ and learning rates $\alpha$, $\alpha_m$.

The training procedure 550 is configured to compute sparse conditional correlations of an inverse of a first covariance matrix in the form of the a first inverse covariance matrix 554 of the first image denoising MLA 320, where the first inverse covariance matrix 554 is representative signature of the first image denoising MLA 320 behavior as it captures the structures remaining in the residue map during training.

The training procedure 550 is configured to calculate a first structured covariance score (SCS) score 556, which is indicative of an ability of the first image denoising MLA 320 to recover content of the clean image patch in the synthetic image patch.

The training procedure 550 is configured to train the second image denoising MLA 350 on the second training dataset 532 using the second set of hyperparameters 538 until convergence.

The second set of hyperparameters 538 identifies a topology of the second image denoising MLA 350, and learning parameters of the second image denoising MLA 350, the learning parameters including learning rates, optimization parameters, and regularization parameters.

In one or more embodiments, the second set of hyperparameters 538 includes: a batch size m, a number of epochs M, a model architecture of the second image denoising MLA 350, regularization parameters $\lambda, \lambda_{rec}, \lambda_{err}$ and learning rates $\alpha, \alpha_m$.

The training procedure 550 is configured to compute a second inverse covariance matrix 564 of the second image denoising MLA 350, where the second inverse covariance matrix 564 is representative signature of the second image denoising MLA 350 behavior as it captures the structures remaining in the residue map during training.

The training procedure 550 is configured to calculate a second structured covariance score (SCS) score 566, which is indicative of an ability of the second image denoising MLA 350 to recover content of the clean image patch in the synthetic image patch.

The training procedure 550 is configured to train the third image denoising MLA 380 on the third training dataset 542 using the third set of hyperparameters 548 until convergence.

The third set of hyperparameters 548 identifies a topology of the third image denoising MLA 380, and learning parameters of the third image denoising MLA 380, the learning parameters including learning rates, optimization parameters, and regularization parameters.

In one or more embodiments, the third set of hyperparameters 548 includes: a batch size m, a number of epochs M, a model architecture of the third image denoising MLA 380, regularization parameters $\lambda, \lambda_{rec}, \lambda_{err}$ and learning rates $\alpha, \alpha_m$.

The training procedure 550 is configured to compute a third inverse covariance matrix 574 of the third image denoising MLA 380, where the third inverse covariance matrix 574 is a representative signature of the third image denoising MLA 380 behavior as it captures the structures remaining in the residue map during training.

The training procedure 550 is configured to calculate a third structured covariance score (SCS) score 576, which is indicative of an ability of the third image denoising MLA 380 to recover content of the clean image patch in the synthetic image patch.

The training procedure 550 is configured to obtain, by using the quality evaluation MLA 290, for each of the first image denoising MLA 320, the second image denoising MLA 340, and the third image denoising MLA 380, a first quality metric 552, a second quality metric 562 and a third quality metric 572 respectively. In one or more embodiments, the first quality metric 552, the second quality metric 562 and the third quality metric 572 are inception scores which measure the respective difference of outputs of the set of image denoising MLAs 300 based on the respective synthetic images and clean (ground-truth) images.

In one or more embodiments, the training procedure 550 is expressed using the following pseudocode:

Pseudocode 1
Initialize a batch size m, a number of epochs M, a model architecture of the first image denoising MLA 320,
Initialize regularization parameters $\lambda, \lambda_{rec}, \lambda_{err}$ and learning rates $\alpha, \alpha_m$
for n=0, . . . , N do
  Sample a batch of de-noised and ground-truth image pairs $\{x_0, x_{gt}\}_{i=1}^m$;
  Initialize $\in_0, \hat{\Sigma}=S=m^{-1}\|\in_0 \in_0^T\|, \hat{\Sigma}=\Sigma^{-1}$;
  for j=1, . . . , m do
    if M is GAN then
      $\mathcal{L}^j = \mathcal{L}_{adv}^j + \lambda_{rec}\mathcal{L}_{rec}^j + \lambda_{err}\|\tilde{\Sigma}\|_1$;
    else
      $\mathcal{L}^j = \mathcal{L}_{rec}^j + \lambda_{err}\|\tilde{\Sigma}\|_1$;
    end
    Compute error map: $\in^j = (x_0^j, x_{gt}^j)$;
  end
  Compute $S = m^{-1}\|\in \in^T\|$;
  Update M weights $\theta \leftarrow \text{Adam}(\mathcal{L}, \alpha, \beta_1, \beta_2)$
  Update $\hat{\Sigma}$ using eq. (6);
  if n mode N/steps==0 then
    Update $\alpha = \max(\alpha \times 10^{-1}, \alpha_m)$;
  end
end In one or more embodiments, an Adam Optimizer is used to learn the objective function with $\beta_1=0.9$ and $\beta_2=0.99$ and a learning rate starting at $10^{-3}$ and attenuated by $10^{-1}$ factor after every 20 epochs until a minimum value equals $10^{-5}$.

In one or more embodiments, the set of image denoising MLAs 300 are trained on a cloud server using a GPU of 2×2496 CUDA Cores and a clock core equal to 562 Mhz.

Customization

The customization procedure 580 comprises a validation procedure 582 and a testing procedure 588.

During the validation procedure 582, the first image denoising MLA 320 is validated on the first validation dataset 524, the second image denoising MLA 350 is validated on the second validation dataset 534, and the third image denoising MLA 380 is validated on the third validation dataset 544.

It will be appreciated that the validation procedure 582 is used to fine-tune each of the first image denoising MLA 320, the second image denoising MLA 340, and the third image denoising MLA 380 by adjusting one or more of first set of hyperparameters 528, the second set of hyperparameters 538 and the third set of hyperparameters 548 respectively.

The testing procedure 588 is used for testing performance of the first image denoising MLA 320, the second image denoising MLA 350, and the third image denoising MLA 380 respectively on the first image testing dataset 526, the second testing dataset 536, and the third testing dataset 546.

Each the first image denoising MLA 320, the second image denoising MLA 350, and the third image denoising MLA 380 is provided with at least one respective test noisy image (not depicted) present in the first image testing dataset 526, the second testing dataset 536, and the third testing dataset 546 respectively. Each of the first image denoising MLA 320, the second image denoising MLA 350, and the third image denoising MLA 380 denoises the respective test noisy image by generating a respective synthetic image. The respective synthetic images may be transmitted to the display interface of the user device 240 for evaluation by the user 245.

During the testing procedure 588, a first user feedback score 592, a second user feedback score 594 and a third user feedback score 596 is obtained from the user 245, where the respective user feedback score 592, 594, 496 is indicative of a user satisfaction with regard to the respective performance of the first image denoising MLA 320, the second image denoising MLA 350, and the third image denoising MLA 380 in denoising a test image of the first image testing dataset 526, the second testing dataset 536, and the third testing dataset 546 respectively.

The user 245, which may be a medical professional such as a radiologist, may for example evaluate a performance of each the first image denoising MLA 320, the second image denoising MLA 350, and the third image denoising MLA 380 in parallel or in sequence by providing a respective user feedback score via an input/output interface such as a keyboard on the user device 240 after receiving the respective synthetic test images generated by denoising test noisy mages in the test images of the first image testing dataset 526, the second testing dataset 536, and the third testing dataset 546.

In one or more embodiments, the first user feedback score 592, the second user feedback score 594 and the third user feedback score 586 are thresholds provided by the user 245 for measuring the performance of the first image denoising MLA 320, the second image denoising MLA 350, and the third image denoising MLA 380 respectively. In one or more embodiments, the user 245 may provide a binary score (not depicted) associated with each of the first user feedback score 592, the second user feedback score 594 and the third user feedback score 586 to indicative if the user 245 is satisfied or not.

The testing procedure 588 calculates, for the first image denoising MLA 320, a first quality parameter 602 based on the first quality metric 552 and the first SCS score 556, e.g. as a weighted sum of the first quality metric 552 and the first SCS score 556.

The testing procedure 588 compares the first quality parameter 602 with the first user feedback score 592. If the first quality parameter 602 is above the first user feedback score 592, the first image denoising MLA 320 may be stored and provided for use for denoising a given noisy image.

If the first quality parameter 602 is below the first user feedback score 592 of the first image denoising MLA 320, the testing procedure 588 may provide an indication to modify one or more acquisition parameters of the imaging apparatus 210, or to modify one or more hyperparameters of the first set of hyperparameters 528 for retraining the first image denoising MLA 320. As a non-limiting example, the testing procedure 588 may provide an indication to modify an x-ray dose of the imaging apparatus 210.

The testing procedure 588 calculates, for the second image denoising MLA 350, a second quality parameter 604 based on the second quality metric 562 and the second SCS score 566, e.g. as a weighted sum of the second quality metric 562 and the second SCS score 566.

The testing procedure 588 compares the second quality parameter 604 with the second user feedback score 594. If the second quality parameter 604 is above the second user feedback score 594 the second image denoising MLA 350 is stored and provided for use for denoising a given noisy image.

If the second quality parameter 604 is below the second user feedback score 594 of the second image denoising MLA 350, the testing procedure 588 provides an indication to modify one or more acquisition parameters 215 of the imaging apparatus 210, and/or to modify one or more hyperparameters of the second set of hyperparameters 538 for retraining the second image denoising MLA 350. As a non-limiting example, the testing procedure 588 may provide an indication to modify an x-ray dose of the imaging apparatus 210.

The testing procedure 588 calculates, for the third image denoising MLA 380, a third quality parameter 606 based on the third quality metric 572 and the third SCS score 576, e.g. as a weighted sum of the third quality metric 572 and the third SCS score 576.

The testing procedure 588 compares the third quality parameter 606 with the third user feedback score 596. If the third quality parameter 606 is above the third user feedback score 596, the third image denoising MLA 380 may be stored and provided for use for denoising a given noisy image.

If the third quality parameter 606 is below the third user feedback score 596 of the third image denoising MLA 380, the testing procedure 588 provides an indication to modify one or more acquisition parameters of the imaging apparatus 210, or to modify one or more hyperparameters of the third set of hyperparameters 548 for retraining the third image denoising MLA 380. As a non-limiting example, the testing procedure 588 may provide an indication to modify an x-ray dose of the imaging apparatus 210.

In one or more embodiments, the testing procedure 588 compares each of the first quality parameter 602, the second quality parameter 604, third quality parameter 606 which are above their respective thresholds, and uses an image denoising MLA in the set of image denoising MLAs 300 associated with a highest quality parameter.

In one or more embodiments, the testing procedure 588 is expressed using the following pseudocode:

Pseudocode 2
Result: User-customized noise-free image
Inputs: number of models (K), test noisy image (x), x-ray dose, test clean image (ground-truth) (y), weight of the SCS $\omega_1$, weight of the IS $\omega\lambda$, threshold thr;
Initialize candidate model list, CM=[]
for k=1, . . . , K do
   Compute $M_k(x)$, $\hat{\Sigma}$ ($M_k$, y), IS($M_k$, y), SCS($M_k$, y);
   if $\omega_1$ (1.0−SCS)+$\Phi_2$IS>thr then
     if M is GAN then
       add $M_k$ to CM;
     end
   end
end
if CM empty then
   increase signal to noise ratio (e.g., x-ray dose);
else
   select from CM the model with lowest scores
end
Where thr is the user feedback score.

Method Description

Figure 6:
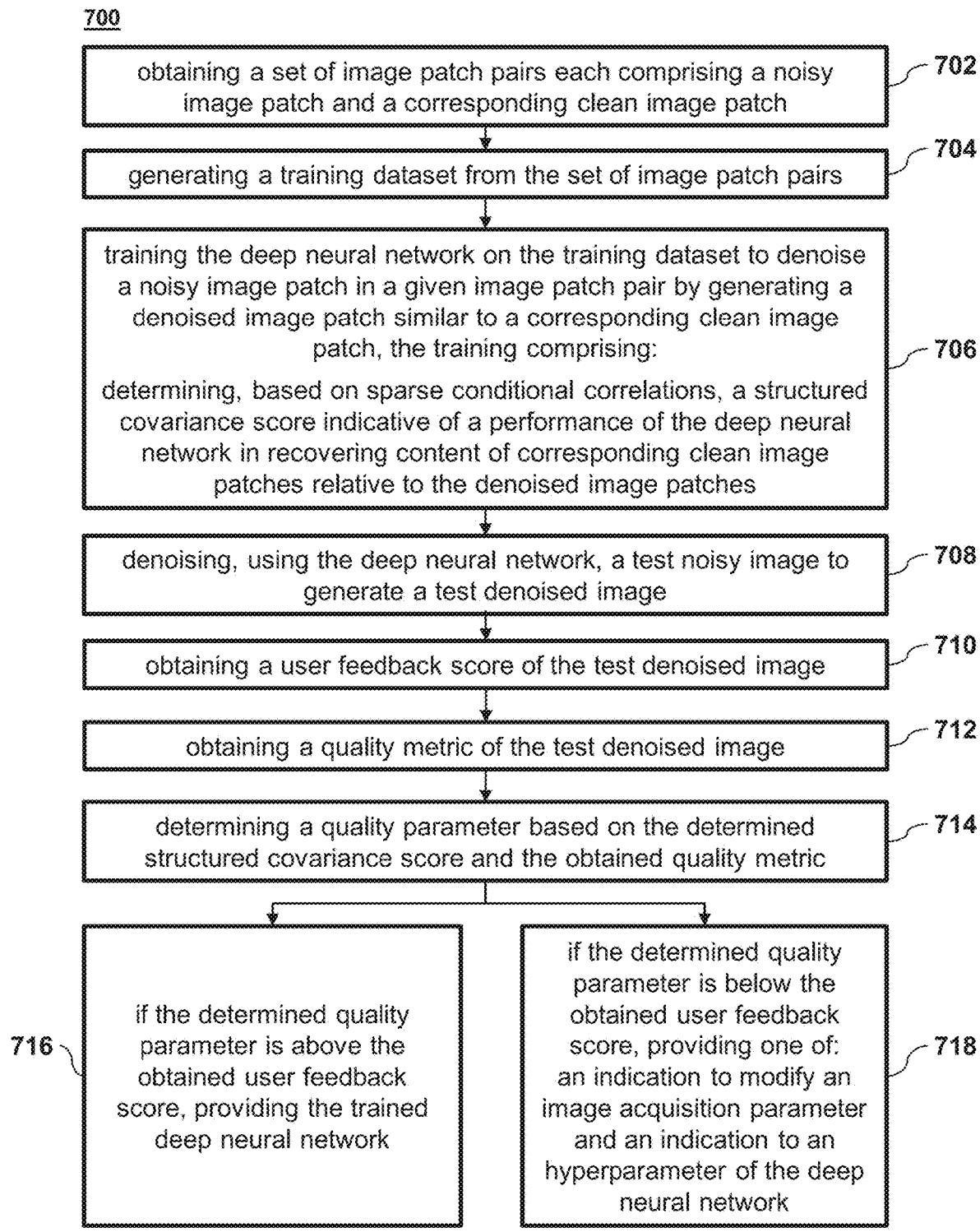
FIG. 6 depicts a flow chart of a computer-implemented method of training and customizing a given image denoising MLA in accordance with one or more non-limiting embodiments of the present technology.

FIG. 6 depicts a flowchart of an embodiment of a method 700 of training and customizing the set of image denoising MLAs 300 for denoising a noisy image by generating a synthetic image, the method 700 being described in accordance with one or more non-limiting embodiments of the present technology.

The method 700 may be executed sequentially for each of the first image denoising MLA 320, the second image denoising MLA 350, and the third image denoising MLA 380 or may be executed in parallel. It will be appreciated that the method 700 may be executed for only one of the first image denoising MLA 320, the second image denoising MLA 350, and the third image denoising MLA 380.

In one or more embodiments, the training server 220 comprises a processing device such as the processor 110 and/or the GPU 111 operatively connected to a non-transitory computer readable storage medium such as the solid-state drive 120 and/or the random-access memory 130 storing computer-readable instructions. The processor 110, upon executing the computer-readable instructions, is configured or operable to execute the method 700.

The method 700 starts at processing step 702.

At processing step 702, the training server 220 obtains the plurality of images 510 acquired by the imaging apparatus 210 where a portion of the images are paired, such that a noisy image in a pair has a corresponding clean image. It will be appreciated that the training server 220 may obtain the plurality of images 510 from the database 230.

In one or more embodiments, the training server 220 preprocesses and segments the plurality of images 510 to obtain a set of image patches for each image. In another embodiment, the training server 220 obtains the set of image patch pairs directly.

At processing step 704, the training server 220 generates, for the first image denoising MLA 320, the first image denoising dataset, the first image denoising set comprising a first training image dataset 522, a first image validation dataset 524, and a first image testing dataset 526. In one or more embodiments, the training server 220 generates the first training image dataset 522, the first image validation dataset 524, and the first image testing dataset 526 such that each of the first training image dataset 522, the first image validation dataset 524, and the first image testing dataset 526 include homogenous image patch pairs.

The training server 220 generates and outputs, for the second image denoising MLA 350, the second image denoising dataset, the second image denoising dataset comprising a second training dataset 532, a second validation dataset 534, and a second testing dataset 536. In one or more embodiments, the image preprocessing and augmentation procedure 520 generates the second training dataset 532, the second validation dataset 534, and the second testing dataset 536 such that the second training dataset 532, the second validation dataset 534, and the second testing dataset 536 include heterogeneous image patch pairs.

The image preprocessing and augmentation procedure 520 generates and outputs, for the third image denoising MLA 380, the third image denoising set, the third image denoising set comprising a third training dataset 542, a third validation dataset 544, and a third testing dataset 546. In one or more embodiments, the image preprocessing and augmentation procedure 520 generates the third training dataset 542, the third validation dataset 544, and the third testing dataset 546 such that the third training dataset 542, the third validation dataset 544, and the third testing dataset 546 include heterogeneous image patch pairs.

At processing step 706, the training server 220 trains the first image denoising MLA 320 on the first training dataset 522 using the first set of hyperparameters 528 until convergence. The first set of hyperparameters 528 identifies a topology of the first image denoising MLA 320, and learning parameters of the first image denoising MLA 320, the learning parameters including learning rates, optimization parameters, and regularization parameters.

In one or more embodiments, the first set of hyperparameters 528 includes: a batch size m, a number of epochs M, a model architecture of the first image denoising MLA 320, regularization parameters $\lambda$, $\lambda_{rec}$, $\lambda_{err}$ and learning rates $\alpha$, $\alpha_m$.

The training server 220 computes a first inverse covariance matrix 554 of the first image denoising MLA 320, where the first inverse covariance matrix 554 is representative signature of the behavior of the first image denoising MLA 320 behavior as it captures the structures remaining in the residue map during training.

The training server 220 calculates a first structured covariance score (SCS) score 556, which is indicative of an ability of the first image denoising MLA 320 to recover content of the clean image patch in the synthetic image patch.

The training server 220 trains the second image denoising MLA 350 on the second training dataset 532 using the second set of hyperparameters 538 until convergence. In one or more embodiments, the second set of hyperparameters 538 includes: a batch size m, a number of epochs M, a model architecture of the second image denoising MLA 350, regularization parameters $\lambda$, $\lambda_{rec}$, $\lambda_{err}$ and learning rates $\alpha$, $\alpha_m$.

The training server 220 computes a second inverse covariance matrix 564 of the second image denoising MLA 350, where the second inverse covariance matrix 564 is a representative signature of the behavior of the second image denoising MLA 350 behavior as it captures the structures remaining in the residue map during training.

The training server 220 calculates a second structured covariance score (SCS) score 566, which is indicative of an ability of the second image denoising MLA 350 to recover content of the clean image patch in the synthetic image patch.

The training server 220 trains the third image denoising MLA 380 on the third training dataset 542 using the third set of hyperparameters 548 until convergence. The third set of hyperparameters 548 identifies a topology of the third image denoising MLA 380, and learning parameters of the third image denoising MLA 380, the learning parameters including learning rates, optimization parameters, and regularization parameters. In one or more embodiments, the third set of hyperparameters 548 includes: a batch size m, a number of epochs M, a model architecture of the third image denoising MLA 380, regularization parameters $\lambda$, $\lambda_{rec}$, $\lambda_{err}$ and learning rates $\alpha$, $\alpha_m$.

The training server 220 computes a third inverse covariance matrix 574 of the third image denoising MLA 380, where the third inverse covariance matrix 574 is representative of a signature of the behavior of the third image denoising MLA 380 as it captures the structures remaining in the residue map during training.

The training server 220 calculates a third structured covariance score (SCS) score 576, which is indicative of an ability of the third image denoising MLA 380 to recover content of the clean image patch in the synthetic image patch.

At processing step 708, the training server 220 provides each of the first image denoising MLA 320, the second image denoising MLA 350, and the third image denoising MLA 380 with at least one respective test noisy image (not depicted) present in the first image testing dataset 526, the second testing dataset 536, and the third testing dataset 546. Each of the first image denoising MLA 320, the second image denoising MLA 350, and the third image denoising MLA 380 denoises the respective test noisy image by generating a respective synthetic image.

The respective synthetic images may be transmitted to the display interface of the user device 240 for evaluation by the user 245.

At processing step 710, the training server 220 obtains from the user device 240 associated with the user 245, a first user feedback score 592, a second user feedback score 594 and a third user feedback score 596, which is indicative of a respective user satisfaction with regard to the respective performance of each of the first image denoising MLA 320, the second image denoising MLA 350, and the third image denoising MLA 380 in denoising the at least one test noisy image of the first image testing dataset 526, the second testing dataset 536, and the third testing dataset 546.

At processing step 712, the training server 220 obtains from the quality evaluation MLA 290, for each of the first image denoising MLA 320, the second image denoising MLA 340, and the third image denoising MLA 380, a first quality metric 552, a second quality metric 562 and a third quality metric 572 respectively. In one or more embodiments, the first quality metric 552, the second quality metric 562 and the third quality metric 572 are inception scores which measure the respective difference of outputs of the quality evaluation MLA 290 between synthetic images and clean (ground-truth) images. In one or more embodiments, step 712 may be executed during training at processing step 706.

At processing step 714, the training server 220 calculates, for the first image denoising MLA 320, a first quality parameter 602 based on the first quality metric 552 and the first SCS score 556, e.g. as a weighted sum of the first quality metric 552 and the first SCS score 556.

The training server 220 calculates, for the second image denoising MLA 350, a second quality parameter 604 based on the second quality metric 562 and the second SCS score 566, e.g. as a weighted sum of the second quality metric 562 and the second SCS score 566.

The testing procedure 588 calculates, for the third image denoising MLA 380, a third quality parameter 606 based on the third quality metric 572 and the third SCS score 576, e.g. as a weighted sum of the third quality metric 572 and the third SCS score 576.

At processing step 716, the training server 220 compares the first quality parameter 602 with the first user feedback score 592. If the first quality parameter 602 is above the first user feedback score 592, the first image denoising MLA 320 may be stored and provided for use for denoising a given noisy image.

The training server 220 compares the second quality parameter 604 with the second user feedback score 594. If the second quality parameter 604 is above the second user feedback score 594 the second image denoising MLA 350 may be stored and provided for use for denoising a given noisy image.

The training server 220 compares the third quality parameter 606 with the third user feedback score 596. If the third quality parameter 606 is above the third user feedback score 596 the third image denoising MLA 380 may be stored and provided for use for denoising a given noisy image.

At processing step 718, the training server 220 compares the first quality parameter 602 with the first user feedback score 592. If the first quality parameter 602 is below the first user feedback score 592 of the first image denoising MLA 320, the training server 220 provides an indication to modify one or more acquisition parameters of the imaging apparatus 210, or to modify one or more hyperparameters of the first set of hyperparameters 528 and revalidate and test the first image denoising MLA 320 with the modified hyperparameters. As a non-limiting example, the training server 220 may provide an indication to modify an x-ray dose of the imaging apparatus 210.

The training server 220 compares the second quality parameter 604 with the second user feedback score 594. If the second quality parameter 604 is below the second user feedback score 594 of the second image denoising MLA 350, the training server 220 provides an indication to modify one or more acquisition parameters 215 of the imaging apparatus 210, or to modify one or more hyperparameters of the second set of hyperparameters 538 and revalidate and test the second image denoising MLA 350 with the modified hyperparameters. As a non-limiting example, the training server 220 may provide an indication to modify an x-ray dose of the imaging apparatus 210.

The training server 220 compares the third quality parameter 606 with the third user feedback score 596. If the third quality parameter 606 is below the third user feedback score 596 of the third image denoising MLA 380, the training server 220 provides an indication to modify one or more acquisition parameters of the imaging apparatus 210, or to modify one or more hyperparameters of the third set of hyperparameters 548 to revalidate and test the third image denoising MLA 380 with the modified hyperparameters. As a non-limiting example, the training server 220 may provide an indication to modify an x-ray dose of the imaging apparatus 210.

It will be appreciated that at least some embodiments of the present technology aim to expand a range of technical solutions for addressing a particular technical problem, namely improving performance of deep neural networks in denoising noisy images acquired by an imaging apparatus, by providing interpretable machine learning models which may be customized and which enables saving computational resources.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A computer-implemented method for training a deep neural network for denoising an image acquired by an imaging apparatus, the computer-implemented method being executed by a processor, the processor having access to a set of machine learning algorithms comprising:
  the deep neural network, and
  a neural network having been trained to determine a quality metric of a denoised image generated by the deep neural network,
  the computer-implemented method comprising:
    obtaining a set of image patch pairs, each image patch pair comprising a noisy image patch and a corresponding clean image patch, the set of image patch pairs having been generated from a plurality of images having been acquired by the imaging apparatus;
    generating a training dataset from the set of image patch pairs;
    training the deep neural network on the training dataset to denoise a noisy image patch in a given image patch pair by generating a denoised image patch similar to a corresponding clean image patch in the given image patch pair, the training comprising:

determining a structured covariance score based on sparse conditional correlations between neighboring pixels in the clean image patches relative to the denoised image patches, the structured covariance score being indicative of a performance of the deep neural network in recovering content of corresponding clean image patches relative to the denoised image patches of the training dataset;

denoising, using the deep neural network, a test noisy image to generate a test denoised image;

obtaining a user feedback score of the test denoised image, the user feedback score being indicative of a user satisfaction of a performance of the deep neural network in denoising the test noisy image;

obtaining a quality metric of the test denoised image, the quality metric having been determined using the neural network, the quality metric being indicative of a quality of the test denoised image generated by the deep neural network based on the test noisy image;

determining a quality parameter of the deep neural network based on the determined structured covariance score and the obtained quality metric; and if the determined quality parameter is above the obtained user feedback score, providing the trained deep neural network.

2. The computer-implemented method of claim 1, wherein the training of the deep neural network comprises, prior to the determining of the structured covariance score: obtaining an error map of residues between the clean image patches relative to the denoised image patches; and estimating a sparse covariance matrix, the sparse covariance matrix being an inverse covariance matrix representing the conditional correlations among neighboring pixels in an error map.

3. The computer-implemented method of claim 2, wherein the determining of the structured covariance score based on the estimated sparse covariance matrix comprises:

quantifying, for each area of non-zero elements in the inverse covariance matrix, a respective spatial density and a respective spatial extent thereof; and calculating a sum of the respective spatial extents weighted by the respective spatial densities.

4. The computer-implemented method of claim 1, wherein the denoising, using the deep neural network, of the test noisy image to generate the test denoised image comprises:

generating, a set of test image noisy patches from the test noisy image;

denoising, using the deep neural network, each test image noisy patch of the set of test noisy image patches to generate a respective denoised image patch, thereby obtaining a set of test denoised image patches; and generating the test denoised image based on the set of test denoised image patches.

5. The computer-implemented method of claim 1, wherein the generating of the training dataset from the set of image patch pairs comprises generating a non-overlapping validation dataset and a testing dataset from the set of image patch pairs, the testing dataset comprising the test images;

the training of the deep neural network further comprises: fine-tuning a set of hyperparameters of the deep neural network on the non-overlapping validation dataset.

6. The computer-implemented method of claim 5, further comprising:

if the determined quality parameter is below the obtained user feedback score, providing one of:

an indication to modify at least one acquisition parameter of the imaging apparatus, and an indication to modify at least one hyperparameter of the set of hyperparameters of the deep neural networks.

7. The computer-implemented method of claim 6, further comprising:

receiving an indication of a modified hyperparameter in the set of hyperparameters;

generating another validation dataset from the set of image patch pairs; and fine-tuning the deep neural network on the another validation dataset using the set of hyperparameters comprising the modified hyperparameter.

8. The computer-implemented method of claim 1, wherein the deep neural network is a first deep neural network, the training dataset is a first training dataset having a first noise level, the first training dataset comprising homogenous image patch pairs, the determined structured covariance score is a first determined structured covariance score, the obtained quality metric is a first obtained quality metric, and the determined quality parameter is a first determined quality parameter; wherein the set of machine learning algorithms further comprises a second deep neural network; and wherein the method further comprises:

generating a second training dataset from the set of image patch pairs, the second training dataset comprising a combination of homogenous image patch pairs having a second noise level and heterogeneous image patch pairs having the second noise level;

training the second deep neural network on the second training dataset to denoise a noisy image patch of a given pair in the second training dataset by generating a denoised image patch similar to a corresponding clean image patch in the given image patch pair in the second training dataset, the training comprising determining a second structured covariance score based on a second covariance matrix;

denoising, using the second deep neural network, the test noisy image to generate a second denoised test image;

obtaining a second quality metric of the second test denoised image, the second quality metric having been determined using the neural network, the second quality metric being indicative of a quality of the second test denoised image generated by the second deep neural network based on the test noisy image;

determining a second quality parameter of the second deep neural network based on the determined second quality metric and the determined second structured covariance score; and if the determined second quality parameter is above both of the obtained user feedback score and the determined first quality parameter, providing the trained second deep neural network.

9. The computer-implemented method of claim 1, wherein the imaging apparatus comprises one of: a computational tomography (CT) scanner, an x-ray apparatus, a LIDAR, and a RADAR.

10. The computer-implemented method of claim 1, wherein
the deep neural network comprises a convolutional neural network; and wherein
the training comprises optimizing an objective function comprising: a reconstruction loss, and an interpretability loss based on the inverse covariance matrix.

11. The computer-implemented method of claim 1, wherein
the deep neural network comprises a generative adversarial network; and wherein
the training comprises optimizing an objective function comprising: a reconstruction loss, an adversarial loss, and an interpretability loss based on the inverse covariance matrix.

12. A computer-implemented method for training a deep neural network for denoising an image acquired by an imaging apparatus, the computer-implemented method being executed by a processor, the computer-implemented method comprising:
obtaining the deep neural network;
obtaining a set of image patch pairs, each image patch pair comprising a noisy image patch and a corresponding clean image patch, the set of image patch pairs having been generated from a plurality of images having been acquired by the imaging apparatus, at least a portion of the set of image patch pairs to be used as a training dataset;
training the deep neural network on the training dataset to denoise a noisy image patch in a given image patch pair by generating a denoised image patch similar to a corresponding clean image patch in the given image patch pair, the training comprising:
determining a structured covariance score based on sparse conditional correlations between neighboring pixels in the clean image patches relative to the denoised image patches, the structured covariance score being indicative of a performance of the deep neural network in recovering content of corresponding clean image patches relative to the denoised image patches of the training dataset;
denoising, using the deep neural network, a test noisy image to generate a test denoised image;
obtaining a user feedback score of the test denoised image, the user feedback score being indicative of a user satisfaction of a performance of the deep neural network in denoising the test noisy image;
obtaining a quality metric of the test denoised image, the quality metric having been determined using a neural network having been trained to determine quality metrics of images, the quality metric being indicative of a quality of the test denoised image generated by the deep neural network based on the test noisy image;
determining a quality parameter of the deep neural network based on the determined structured covariance score and the obtained quality metric; and
if the determined quality parameter is above the obtained user feedback score, providing the trained deep neural network.

13. The computer-implemented method of claim 12, wherein
the training of the deep neural network comprises using a set of hyperparameters; and wherein the method further comprises:
if the determined quality parameter is below the obtained user feedback score, providing one of:
an indication to modify at least one acquisition parameter of the imaging apparatus, and
an indication to modify at least one hyperparameter of the set of hyperparameters of the deep neural network.

14. A system for training a deep neural network for denoising an image acquired by an imaging apparatus, the system comprising:
a processor, the processor having access to a set of machine learning algorithms comprising:
the deep neural network, and
a neural network having been trained to determine a quality metric of a denoised image generated by the deep neural network,
the processor being operatively connected to a non-transitory storage medium comprising instructions,
the processor, upon executing the instructions, being configured to:
obtain a set of image patch pairs, each image patch pair comprising a noisy image patch and a corresponding clean image patch, the set of image patch pairs having been generated from a plurality of images having been acquired by the imaging apparatus;
generate a training dataset from the set of image patch pairs;
train the deep neural network on the training dataset to denoise a noisy image patch in a given image patch pair by generating a denoised image patch similar to a corresponding clean image patch in the given image patch pair, the training comprising:
determining a structured covariance score based on sparse conditional correlations between neighboring pixels in the clean image patches relative to the denoised image patches, the structured covariance score being indicative of a performance of the deep neural network in recovering content of corresponding clean image patches relative to the denoised image patches of the training dataset;
denoise, using the deep neural network, a test noisy image to generate a test denoised image;
obtain a user feedback score of the test denoised image, the user feedback score being indicative of a user satisfaction of a performance of the deep neural network in denoising the test noisy image;
obtain a quality metric of the test denoised image, the quality metric having been determined using the neural network, the quality metric being indicative of a quality of the test denoised image generated by the deep neural network based on the test noisy image;
determine a quality parameter of the deep neural network based on the determined structured covariance score and the obtained quality metric; and
if the determined quality parameter is above the obtained user feedback score, provide the trained deep neural network.

15. The system of claim 14, wherein to train the deep neural network, the processor is further configured to, prior to the determining of the structured covariance score: obtain an error map of residues between the clean image patches relative to the denoised image patches; and estimate a sparse covariance matrix, the sparse covariance matrix being an inverse covariance matrix representing the conditional correlations among neighboring pixels in an error map.

16. The system of claim 15, wherein to determine the structured covariance score based on the estimated sparse covariance matrix, the processor is configured to:

quantify, for each area of non-zero elements in the inverse covariance matrix, a respective spatial density and a respective spatial extent thereof; and calculate a sum of the respective spatial extents weighted by the respective spatial densities.

17. The system of claim 14, wherein to denoise, using the deep neural network, the test noisy image to generate the test denoised image, the processor is further configured to:

generate, a set of test image noisy patches from the test noisy image;

denoise, using the deep neural network or, each test image noisy patch of the set of test noisy image patches to generate a respective denoised image patch of a set of test denoised image patches; and generating the test denoised image based on the set of test denoised image patches.

18. The system of claim 17, wherein the generating of the training dataset from the set of image patch pairs comprises generating a non-overlapping validation dataset and a testing dataset from the set of image patch pairs, the testing dataset comprising the test images;

the training of the deep neural network further comprises:

fine-tuning a set of hyperparameters of the deep neural network on the non-overlapping validation dataset.

19. The system of claim 18, wherein if the determined quality parameter is below the obtained user feedback score, the processor is configured to provide one of:

an indication to modify at least one acquisition parameter of the imaging apparatus, and an indication to modify at least one hyperparameter of the set of hyperparameters of the deep neural networks.

20. The system of claim 19, wherein the processor is further configured to:

receive an indication of a modified hyperparameter in the set of hyperparameters; and generate another validation dataset from the set of image patch pairs; and fine-tune the deep neural network on the another validation dataset using the set of hyperparameters comprising the modified hyperparameter.

* * * * *